US008032754B2

(12) United States Patent
Mihcak et al.

(10) Patent No.: US 8,032,754 B2
(45) Date of Patent: Oct. 4, 2011

(54) SYSTEMS AND METHODS FOR EMBEDDING MEDIA FORENSIC IDENTIFICATION MARKINGS

(75) Inventors: Mehmet Kivanc Mihcak, Redmond, WA (US); Ramarathnam Venkatesan, Redmond, WA (US); Mehmet Kucukgoz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 10/754,235

(22) Filed: Jan. 9, 2004

(65) Prior Publication Data

US 2005/0154892 A1 Jul. 14, 2005

(51) Int. Cl.
*H04L 9/32* (2006.01)
(52) U.S. Cl. ........................................... 713/176
(58) Field of Classification Search .................. None
See application file for complete search history.

(56) References Cited

U.S. PATENT DOCUMENTS

| | | | |
|---|---|---|---|
| 6,519,351 B2 * | 2/2003 | Kimura et al. | 382/100 |
| 6,549,494 B2 | 4/2003 | Kobayashi | |
| 6,605,819 B2 | 8/2003 | Ross | |
| 6,704,431 B1 | 3/2004 | Ogawa et al. | |
| 7,006,656 B2 * | 2/2006 | Fridrich et al. | 382/100 |
| 7,007,166 B1 * | 2/2006 | Moskowitz et al. | 713/176 |
| 7,116,781 B2 * | 10/2006 | Rhoads | 380/59 |
| 2002/0172394 A1 * | 11/2002 | Venkatesan et al. | 382/100 |
| 2004/0001605 A1 * | 1/2004 | Venkatesan et al. | 382/100 |

OTHER PUBLICATIONS

M. Kivanc Mihcak, et al., Watermarking via Optimalization Algorithms for Quantizing Randomized Statistics of Image Regions, Proceedings of the Fourtieth Annual Allerton Conference on Communication, Control and Computing, Oct. 2002.
Christine I. Podilchuk,et al., Three Demensional Subband Coding of Video, IEEE Transactions on Image Processing, Feb. 1995, 125-138, vol. 4, No. 2.
Geert Depovere, et al., The VIVA Project: Digital Watermarking for Broadcasting Monitoring, Image Processing, 1999, 5 pages.
M. Kivanc Mihcak, New Interactive Geometric Methods for Robust Perceptual Image Hashing, Proceedings of AMC Workshop on Security and Privacy in Digital Rights Management, Nov. 2001, 9 pages.
Jana Dittmann, et al., H2O4M—Watermarking for Media: Classification, Quality Evaluation, Design Improvements, Proceedings of the 2000 ACM workshops on Multimedia, 2000, pp. 107-110, Los Angeles, California.
Christian Collberg, et al., Software Watermarking: Models and Dynamic Embeddings, POPL'99, 1999, 14 pages.
A.B. Kahng, et al., Watermarking Techniques for Intellectual Property Protection, Design Automation Conference, 1998, 6 pages.
Lintian Qiao, et al., Watermarking Schemes and Protocols for Protecting Rightful Ownership and Customer's Rights, International Conference on Multimedia Computing and Systems, 1998, pp. 1-28.

* cited by examiner

*Primary Examiner* — Benjamin E Lanier
(74) *Attorney, Agent, or Firm* — Lee & Hayes, PLLC

(57) ABSTRACT

The present invention leverages a series of media watermark locations to provide information relating to media ownership and/or distribution source. This provides a forensic means to establish a source of media with a high degree of certainty despite malicious and/or non-malicious attacks. By providing embedded user unique identification, a source of copied media can be determined without the embedded information substantially interfering with the intended purpose of the media itself. In one instance of the present invention, digital media is transformed into an N-dimensional media signal. User unique keys are then utilized along with a master key to determine locations for embedding a watermark signal that possesses substantially similar quantized statistics as the transformed media signal. The watermark signal is then embedded into the media signal, fingerprinting the media.

15 Claims, 21 Drawing Sheets

SYSTEMS AND METHODS FOR EMBEDDING MEDIA FORENSIC IDENTIFICATION MARKINGS

TECHNICAL FIELD

The present invention relates generally to media watermarking, and more particularly to systems and methods for embedding forensic identification markings into media.

BACKGROUND OF THE INVENTION

In order to encourage the sharing of ideas and creativity, countries often provide laws to protect ideas and expressions. Thus, a writer who composes a novel has rights in his work to facilitate him in exploiting his book. Without these rights, anyone could claim his work and sell it as their own. If this were allowed, the writer would not be as willing to publish his next novel. This, in effect, would curb public dissemination of valuable works for the good of all. The laws that govern the protection of such works generally have been around for many years. However, even if protective laws do exist, they must also be enforced in order for them to be effective. Typically, it is the enforcement process that often limits the value of a law. The intent to enforce may be genuine, but the ability to enforce may be lacking due to limits in technology.

Before the advent of the digital age, tracking of illegally copied goods generally rested on the ability to distinguish the genuine article from an illegal copy. Forensic techniques such as, for example, those relating to painting could be applied to a forged painting to determine its authenticity. With enough available evidence, it might even be possible to decipher who the forging artist is (such as by brush stroke technique, etc.). This type of detective work rests heavily on the availability of physical evidence. However, with the advent of the digital age, ideas and expressions are now reduced down to ones and zeroes, which are much easier to manipulate and duplicate. The digital aspect of these items permits exact duplicates of an original to be created. This typically can be accomplished with no indication whatsoever of which party actually did the copying.

Because of the ease of copying, techniques were developed to facilitate in making it easier to tell a digital original from a digital copy and/or where the digital information originated from. One such technique is to "watermark" a product. The term watermarking originally comes from a technique for marking paper. A paper watermark is usually visible only when the paper is held to a light source. A paper company would often use this technique to mark their name in the paper so that customers would be able to identify them as the maker of the paper. This technique has been modernized to facilitate in identifying the sources in digital (and analog) versions of items such as movies, photographs, and audio products.

The earliest versions of digital watermarking were very distinctive and often interfered with utilizing the product. For example, photographs would have the source printed directly across the photograph, affecting its aesthetics as a trade-off to protecting the object from being copied. This was often accomplished by utilizing a "layer" over the photograph in a digital imaging software product. Thus, in the digital realm, a party could also employ a software product to effectively remove these types of marks digitally. Thus, better ways of embedding the information in the digital data of the photographs have been developed in response to prevent easy removal of the watermarks.

However, despite the progression of digital watermarking technology, one of the drawbacks has been the lack of identifying sources from which parties illegally copy goods. Typically, a company will make multiple copies to disseminate to various distributors for distribution and/or use of the product. The originating company only intends for the product to be utilized as permitted within its legal rights and agreements with those parties that it disseminates its products to. Even if the originating company watermarks its product, illegally copied goods can only be traced back to the originating company. Often this is not, on its face, additional information. For example, a movie company producing a new movie with a distinct array of actors will know from the material itself that the movie originates from their company. Ideally, the originating company would like to know which authorized copy was employed to disseminate its product illegally. This would permit the company to take legal action against the guilty party who allowed the product to be copied. Technology utilized today permits various types of watermarking to be achieved, but with varying degrees of success. Often the watermark interferes with the use of a product. For example, one would not particularly enjoy watching a movie with a red watermark across the screen reading "distributed by company A." Likewise, seemingly less intrusive technology often blurs images and/or interferes with the audio. To be effective, a technology must provide virtually undetectable incorporation of a watermark into a product, while still maintaining robust protection of the watermark itself. It must also permit the ability to distinguish between authorized copies in order to facilitate forensic analysis to determine sources of illegal copies. It is also significant that watermarks cannot be removed and/or impersonated by unauthorized parties; visible watermarks obviously do not fall into this category. This same problem also occurs when the watermark is perceptually invisible, but the watermarking algorithm does not have enough inherent secrecy (i.e., security).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to media watermarking, and more particularly to systems and methods for embedding and/or detecting forensic identification markings into/from media. A series of media watermark locations are leveraged to provide information relating to the media's ownership and/or distribution source. This provides a forensic means to establish a source with a high degree of certainty despite malicious and/or non-malicious attacks. By providing embedded user unique identification, media can enable forensic detection for identifying the source of copied media without the embedded information substantially interfering with the intended purpose of the media itself. In one instance of the present invention, digital media is transformed into an N-dimensional media signal. User unique keys are then utilized along with a master key to determine locations for embedding a watermark signal that possesses substantially similar quantized statistics as the transformed media signal. The watermark signal is then embedded into the media signal, fingerprinting the media.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
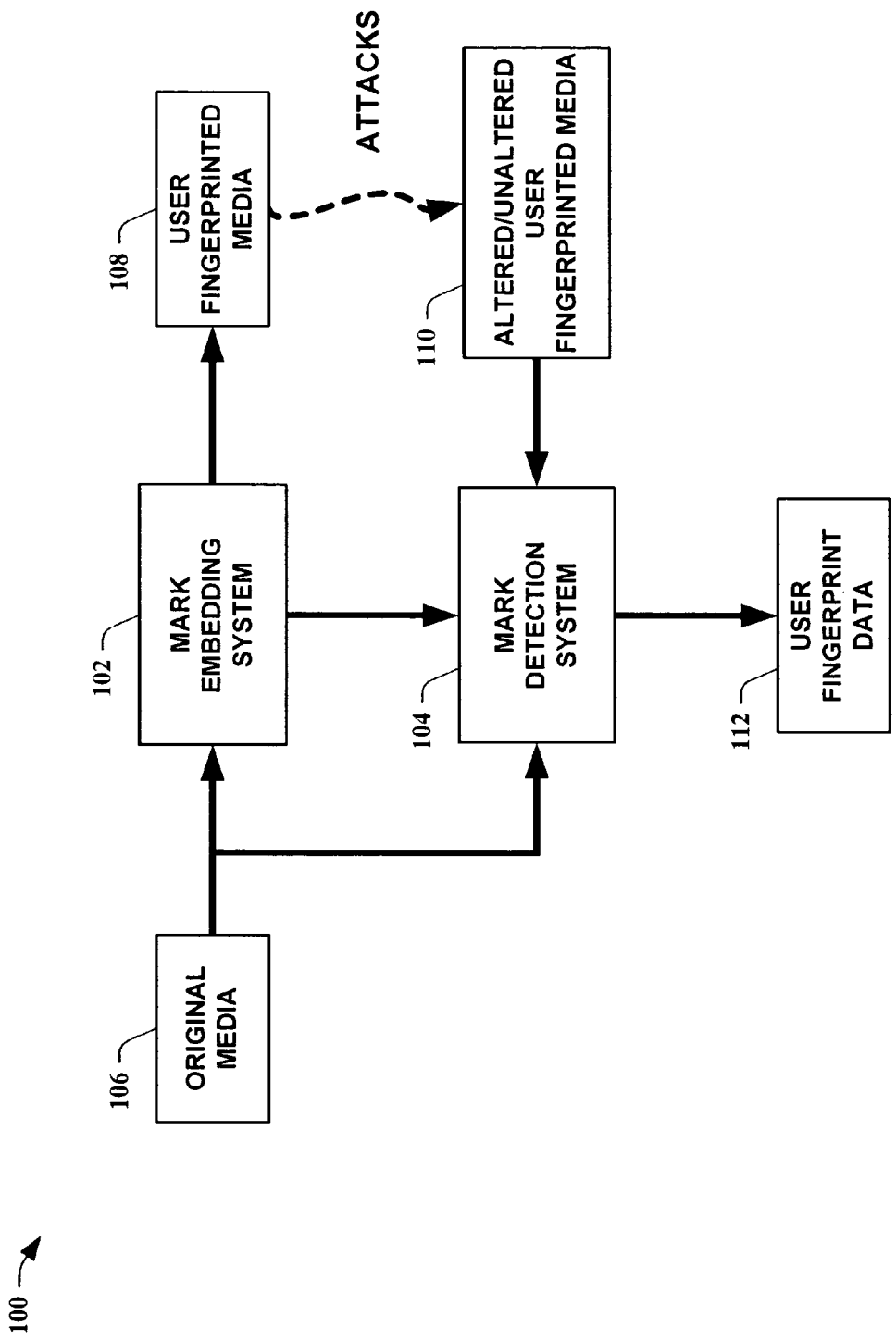
FIG. 1 is a block diagram of a media forensic system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a service, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes. A "state" of a networked system refers to a condition of the networked system in relation to, but not limited to, performance, health, and usage parameters. A state can be a snapshot of a system's status relating to an historical instance in time and/or to a current instance in time and/or a future instance in time.

The present invention provides forensic mark embedding and/or detection systems and methods for digital media signals. Media can include, but is not limited to, audio, images, and video and the like. The present invention facilitates media forensics and, therefore, it is assumed that there is access to an original unmarked media source for the detection systems and methods. Detection provided by the present invention is not bounded by computational complexity requirements. Furthermore, the public (potentially users or attackers) does not have access to the watermark detector and/or decoder. The systems and methods provide robustness against malicious, such as collusion type of attacks between different users, and non-malicious attacks, such as degradation of the media due to compression and the like. The present invention can be utilized with such media, for example, as DVD (digital versatile discs) and the like to provide forensics analysis for DVD movies. It provides security against estimation-like cryptographic attacks and is robust against reasonable malicious and/or non-malicious modifications (e.g., compression, noise addition, rotation, cropping, editing and/or compression along time, dynamic range processing attacks such as scaling and histogram equalization, etc.) while keeping the false positive probability low (not accusing a false user). For example, in one instance of the present invention in a fingerprinting scenario, there may be several users, each of which is represented by a different mark embedded media utilizing separate keys for each user. Moreover, it is also possible to use two or more separate groups of keys to encode the identity of each user; such an approach employs assignment of fingerprinting codes to represent different users. This produces a different mark-embedded output for each user that is perceptually approximately the same as an original media. The present invention, likewise, provides for detection of these users (if any) with a reasonable probability of error.

The present invention treats digital media as an N-dimensional signal, where N represents a positive integer from one to infinity, and accordingly applies an N-dimensional transform, such as, for example, a 3D wavelet transform, to the media. The present invention employs a pseudo-random algorithm where each user's ID (identification) is utilized as a key of a secure pseudo-random number generator in randomized steps of the algorithm. Furthermore, by using this system as a mark embedding layer, it is also possible to embed each user's ID using fingerprinting codes. Pseudo-random objects, such as rectangular prisms, spheres, cylinders, and the like, are generated in the DC sub-band (lowest or "0,0" sub-band) of the discrete wavelet transform (DWT). For each object, pseudo-random weights (chosen from a Gaussian distribution subject to smoothness constraints) are generated. Then, a pseudo-random linear statistic is derived for each object by finding the inner product of pseudo-random weights corresponding to that object and the elements of that object. The linear statistics vector is quantized in a pseudo-random way, and a minimum-norm disturbance (watermark) in an original signal domain is then found that would correspond to the quantized statistics. It is also possible to apply regularization and/or smoothing techniques on top of the minimum-norm disturbance to make the watermark more tolerable to human perception. Additional conditions may further be imposed in the formation of the disturbance. Mark embedding is achieved by adding this disturbance to the original signal.

Detection of the watermarked signal utilizes a variant of a correlation detector. It is assumed that the original statistics and the quantized statistics are available for detection to facilitate forensics analysis. Optionally, histogram-equalization-based pre-processing operations can be applied during both embedding and detection to gain robustness against dynamic range processing and/or histogram equalization and/or scaling type attacks. Additionally, this mark embedding scheme is applied in pseudo-randomly chosen appropriate places of the digital media. The locations of the mark-embedded media are determined via robust image hash functions during detection. Details are discussed infra. It is possible to use several search techniques at the detector to improve robustness against geometric attacks (e.g., search along the temporal axis, search of the objects whose statistics have been quantized, etc.).

The present invention is extremely advantageous in industries where digital media is disseminated in a controlled manner for further distribution either by public consumption and/or copying. For example, utilizing the present invention, a movie company can embed different marks for different users (say different movie theaters and/or different people inside the company for a pre-release). When leakage of the movie occurs, it is possible to determine a leaking party with reasonably high accuracy via forensic analysis facilitated by the present invention.

In FIG. 1, a block diagram of a media forensic system 100 in accordance with an aspect of the present invention is shown. The media forensic system 100 is comprised of a mark embedding system 102 and a mark detection system 104. Original media 106, in some form, is available to both the mark embedding system 102 and the mark detection system 104. The original media 106 is watermarked by the mark embedding system 102 to produce a user fingerprinted media 108. Typically, this media 108 is subject to malicious and/or non-malicious attacks that can possibly change its original form. This produces altered/unaltered user fingerprinted media 110 that is processed in a forensic analysis to determine a user associated with the user fingerprinted media 108 by the mark detection system 104. The mark detection system 104 determines a user, if any, (and/or possibly a set of users who may have been involved in the formation of an attacked media) and outputs information relating to the forensic analysis, such as user fingerprint data 112. During detection, the mark detection system 104 employs data generated by the mark embedding system 102 to facilitate user identification (illustrated as an arrow from the mark embedding system 102 to the mark detection system 104). The user fingerprint data 112 can then be utilized to prosecute illegal copying and/or distribution and the like of the original media 106.

Figure 2:
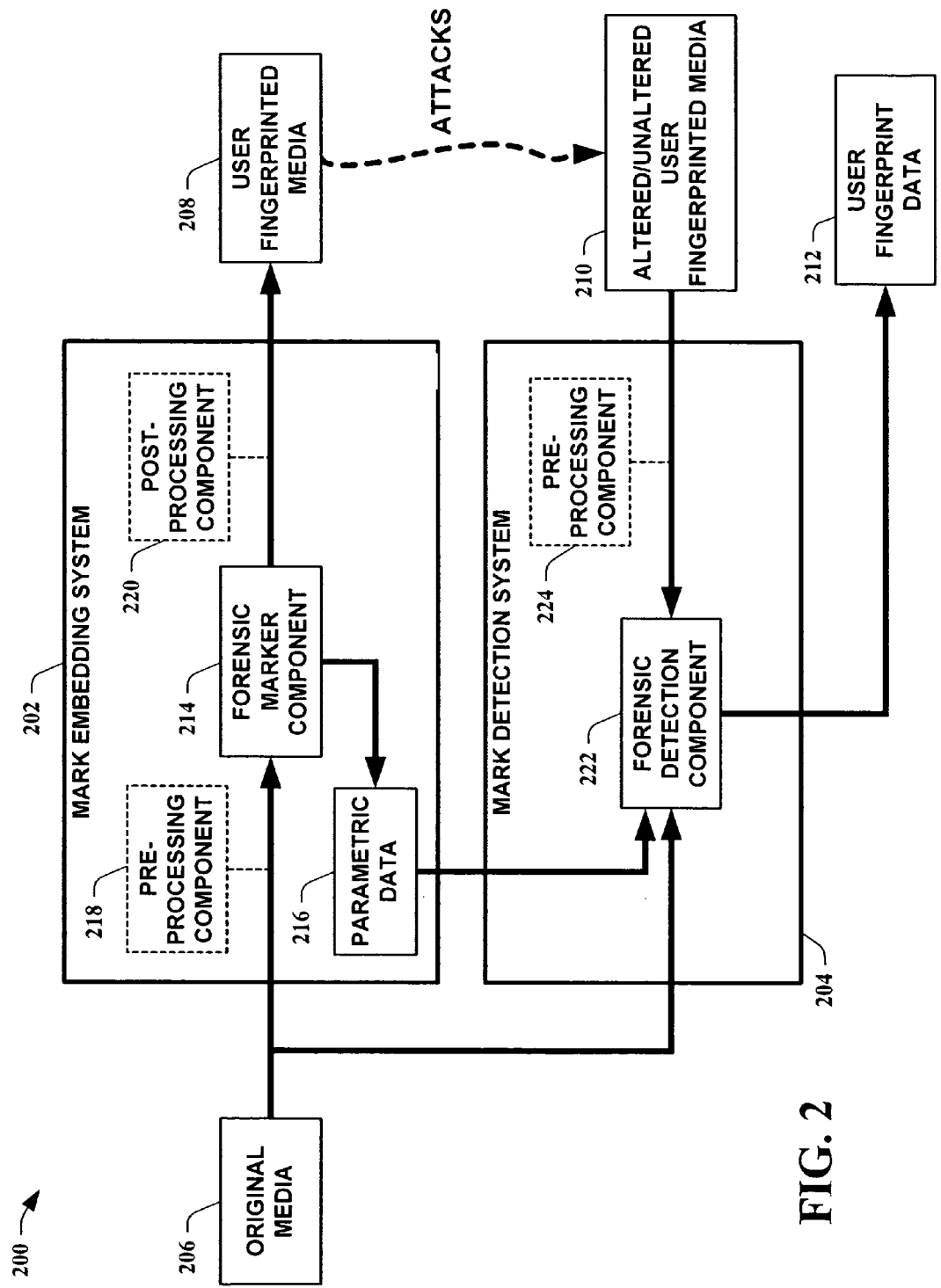
FIG. 2 is another block diagram of a media forensic system in accordance with an aspect of the present invention.

Referring to FIG. 2, another block diagram of a media forensic system 200 in accordance with an aspect of the present invention is depicted. The media forensic system 200 is comprised of a mark embedding system 202 and a mark detection system 204. Original media 206, in some form, is available to both the mark embedding system 202 and the mark detection system 204. The original media 206 is watermarked by the mark embedding system 202 to produce a user fingerprinted media 208. The mark embedding system 202 is comprised of a forensic marker component 214, parametric data 216, optional pre-processing component 218, and optional post-processing component 220. The forensic marker component 214 determines embedding locations and embeds a watermark into the original media 206. It 214 also produces parametric data 216 that is comprised of information related to embedding locations of the watermark. This data 216 can be stored locally and/or remotely and/or disseminated to other entities. Typically, the parametric data 216 is supplied to the mark detection system 204 to facilitate in forensic analysis of media. The optional pre-processing component 218 facilitates robustness against scaling type of attacks and is accomplished before watermarking of the media. Both the optional pre-processing component 218 and the post-processing component 220 are point operators (i.e., modifications based on entities such as pixel values and the like so as to change distribution of the entities) on individual entities in the spatial domain. One skilled in the art will appreciate that other pre- and post-processing components can be used to achieve robustness against dynamic range processing attacks.

As stated supra, typically, the user fingerprinted media 208 is subject to malicious and/or non-malicious attacks that can possibly change its original form. This produces altered/unaltered user fingerprinted media 210 that is processed in a forensic analysis to determine a user associated with the user fingerprinted media 208 by the mark detection system 204. The mark detection system 204 determines a user, if any, and outputs information relating to the forensic analysis, such as user fingerprint data 212. The mark detection system 204 is comprised of a forensic detection component 222 and an optional pre-processing component 224. The forensic detection component 222 utilizes the parametric data 216 from the mark embedding system 202 to facilitate in determining a user, if any, associated with the altered/unaltered user fingerprinted media 210. The optional pre-processing component 224 is utilized in conjunction with the optional pre-processing component 218 and post-processing component 220. It 224 functions similarly to the pre-processing component 218 of the mark embedding system 202. The user fingerprint data 212 can then be utilized to prosecute illegal copying and/or distribution and the like of the original media 206.

Figure 3:
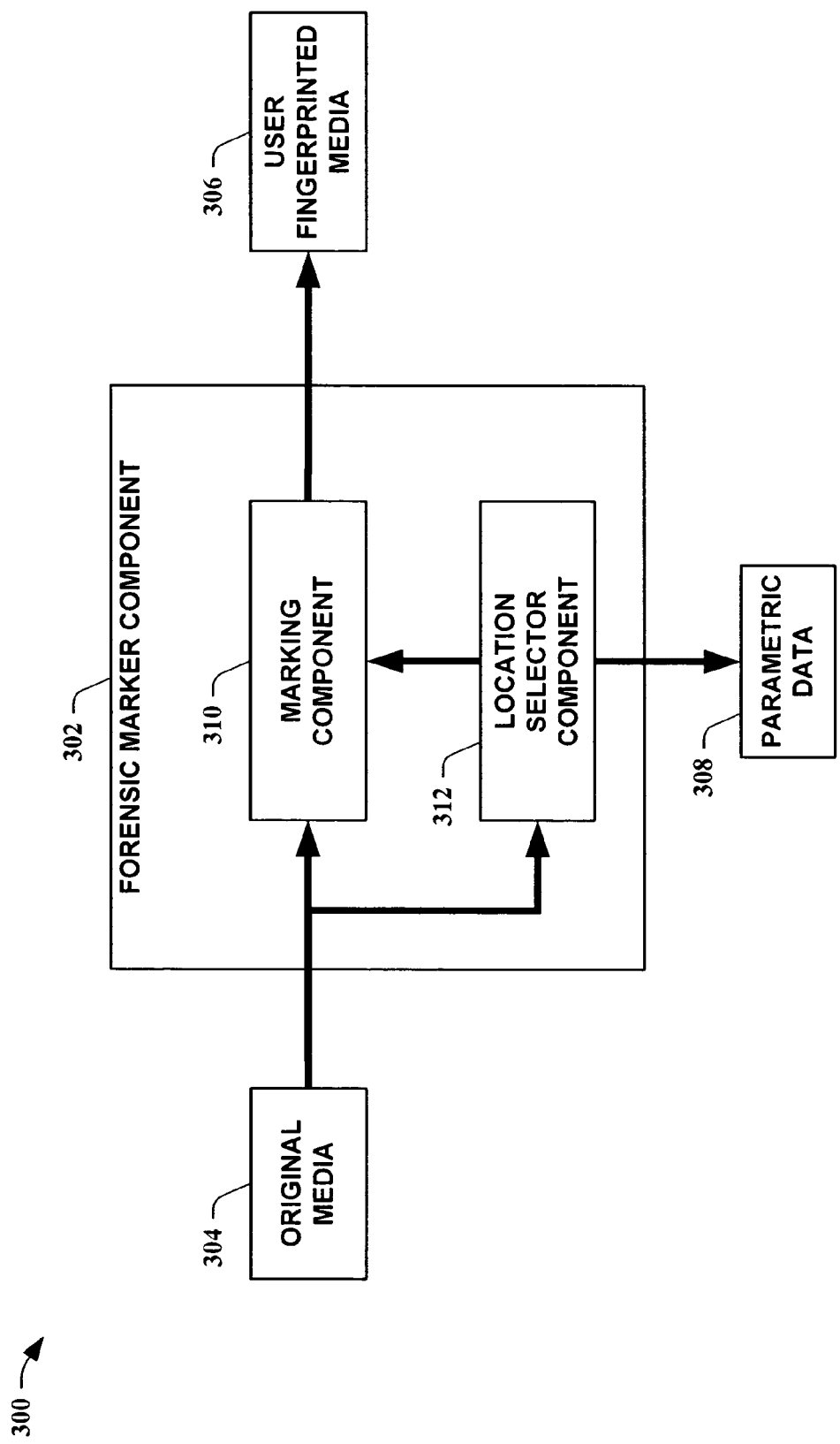
FIG. 3 is a block diagram of a mark embedding system in accordance with an aspect of the present invention.

Turning to FIG. 3, a block diagram of a mark embedding system 300 in accordance with an aspect of the present invention is illustrated. The mark embedding system 300 is comprised of a forensic marker component 302. The forensic marker component 302 is comprised of a marking component 310 and a location selector component 312. Original media 304 is made available to the marking component 310 and/or the location selector component 312. Although, the marking component 310 and the location selector component 312 are illustrated as separate entities, they can be combined into a single entity and/or pass required information between them such that only one entity is required to receive the original media 304. The marking component 310 watermarks the original media 304 at embedding locations determined by the location selector component 312. This produces a user fingerprinted media component 306 that can be tracked through forensic analysis. The location selector component 312 utilizes a user key and a master key to determine embedding locations. The component 312 initially randomly chooses a location to embed a watermark; but then tests if the chosen region is "watermarkable", i.e., if there is enough activity (information, entropy, etc.) in the chose location. The watermarkability criterion is important, because it is not advisable to embed a watermark in a region where there is little or no activity (e.g., no motion for digital video) since in that case an attacker can find out embedded watermark via an appropriately designed estimation type attack. Furthermore, during a location determination process, hash center points and "poles" are determined which are output as parametric data 308 by the location selector component 312. The parametric data 308 is utilized by a detection component (not shown) for media forensic analysis.

Figure 4:
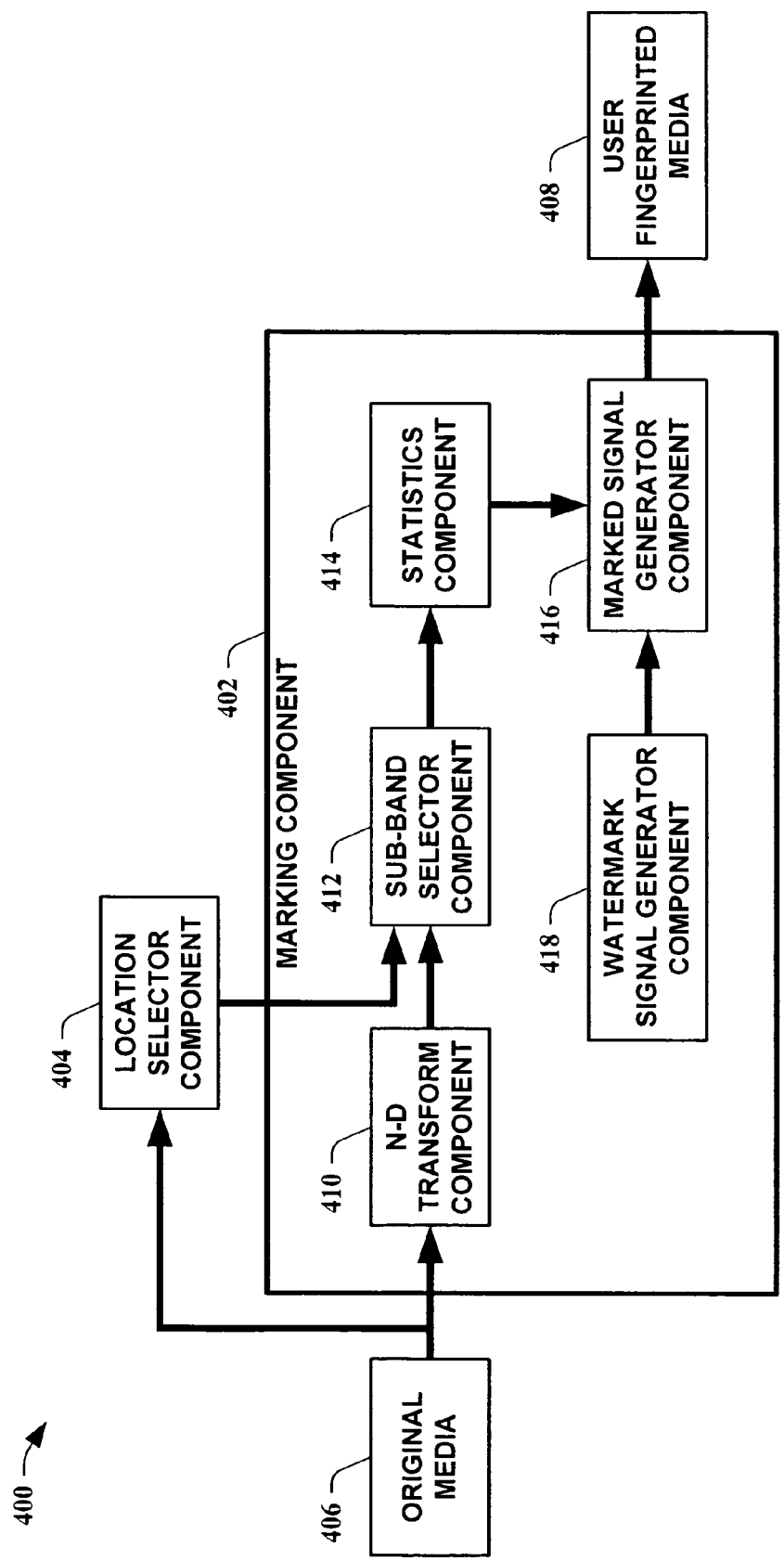
FIG. 4 is a block diagram of a forensic marker component in accordance with an aspect of the present invention.

Moving on to FIG. 4, a block diagram of a forensic marker component 400 in accordance with an aspect of the present invention is shown. The forensic marker component 400 is comprised of a marking component 402 and a location selector component 404. Original media 406 is input into the location selector component 404 and the marking component 402 to produce a user fingerprinted media 408. The marking component 402 is comprised of an N-dimensional transform component 410, a sub-band selector component 412, a statistics component 414, a marked signal generator component 416, and a watermark signal generator component 418. The original media 406 is transformed by the N-dimensional transform component 410 into an N-dimensional signal (also known as "an original unmarked signal"), where N represents a positive integer from one to infinity. As an example, the N-dimensional transform component 410 can convert the original media 406 utilizing a 3-dimensional transform to convert media, such as a video, into a 3-dimensional signal. A sub-band of the N-dimensional signal is then selected via the sub-band selector component 412. The sub-band selector component 412 also utilizes information from the location selector component 404 to facilitate in selecting an appropriate sub-band. The information includes data relating to an embedding location that facilitates sub-band selection. Statistics derived from entities within objects of the sub-band are then determined by the statistics component 414. The statistics component 414 also quantizes and relays statistics related information to the marked signal generator component 416. The watermark signal generator component 418 generates a watermark signal and sends it to the marked signal generator component 416. The marked signal generator component 416 employs an algorithm of the present invention to determine if a watermarked signal, that is a composition of the watermark signal and the original unmarked signal, has the statistics which are quantized versions of the statistics of the original unmarked signal. In general, quantization can be carried out via any vector quantization method that includes high dimensional lattice quantization. The watermark signal is incorporated into the original media 406, thereby forming a watermarked signal or user fingerprinted media 408 whose statistics are quantizated versions of the statistics of the original media 406.

Figure 5:
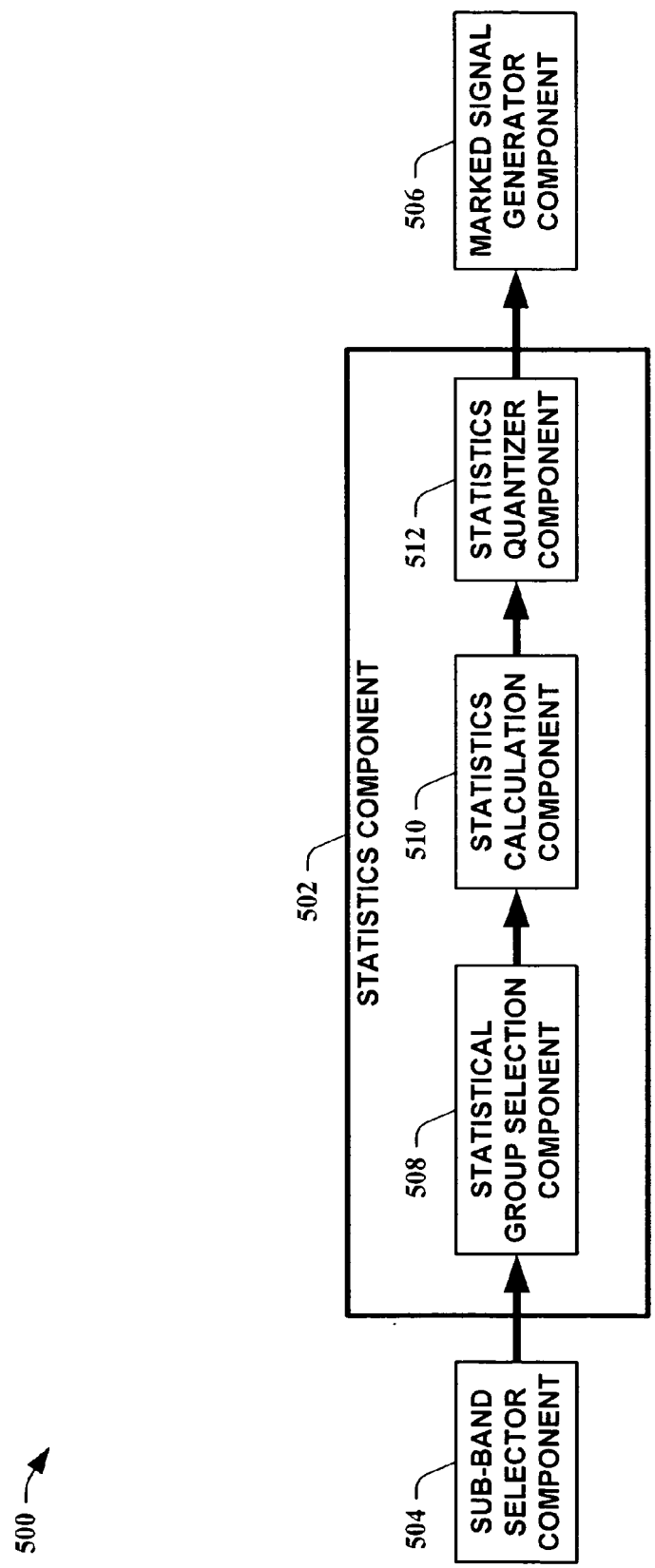
FIG. 5 is a block diagram of a portion of a forensic marker component in accordance with an aspect of the present invention.

In FIG. 5, a block diagram of a portion of a forensic marker component 500 in accordance with an aspect of the present invention is shown. The portion of the forensic marker component 500 is comprised of a statistics component 502, a sub-band selector component 504, and a marked signal generator component 506. The statistics component 502 is comprised of a statistical group selection component 508, a statistics calculation component 510, and a statistics quantizer component 512. A selected sub-band is determined by the sub-band selector component 504 and passed to the statistical group selection component 508. The statistical group selection component 508 then determines what randomized portion and configuration is utilized for determining statistics employed by the marked signal generator component 506. The selected configurations can include objects such as rectangular prisms, cubes, cylinders, and spheres and the like. Note that these objects need not be connected sets in general although this example of an instance of the present invention is confined to connected sets. The statistics calculation component 510 then determines statistics for the selected entities (e.g., pixels, etc.) from the selected configurations (i.e., objects). Entities can include, but are not limited to, pixels and the like. This example of an instance of the present invention computes pseudo-random linear statistics. However, other instances of the present invention can utilize various alternative statistics including non-linear ones (e.g., higher order moments of the objects such as variance information, etc.). The statistics of the entities are then quantized by the statistics quantizer component 512 and passed to the marked signal generator component 506 to facilitate in selecting an appropriate watermark signal. The quantization is carried out by high dimensional vector quantization. Special cases include high dimensional lattice quantization, integer lattice quantization (i.e., uniform scalar quantization) and/or any other quantization methods that are used in the signal processing community. In one instance of the present invention, uniform scalar quantization is utilized for simplicity.

Figure 6:
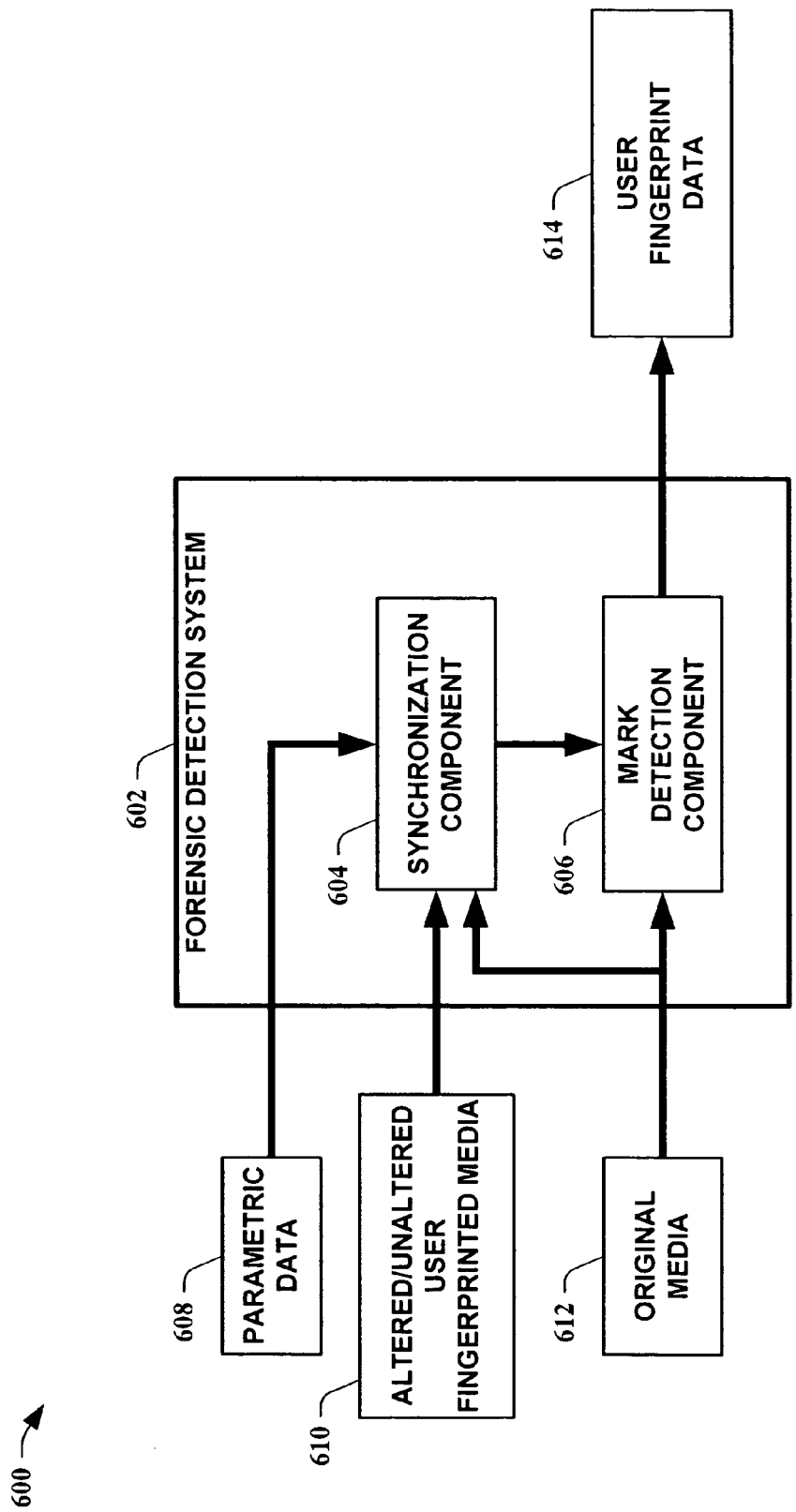
FIG. 6 is a block diagram of a mark detection system in accordance with an aspect of the present invention.

Referring to FIG. 6, a block diagram of a mark detection system 600 in accordance with an aspect of the present invention is illustrated. The mark detection system 600 is comprised of a forensic detection system 602. The forensic detection system 602 is comprised of synchronization component 604 and a mark detection component 606. Parametric data 608 from a mark embedding system (not shown) is utilized to facilitate synchronizing original media 612 with an altered/unaltered user fingerprinted media 610. An optional pre-processing component (not shown), described supra, can also be utilized by the forensic detection system 602 before information is passed to the mark detection component 606. The mark detection component 606 employs a detection algorithm to determine which user is associated with the altered/unaltered user fingerprinted media 610. The detection algorithm generally consists of computing the correlation value, i.e., the correlation between the embedded mark and the received possible mark. Different variants of the correlation detection rule can be employed; such rules include, for example, randomized correlation rules, correlation of samples after applying appropriate weighting factors, etc. The determination is output as user fingerprint data 614.

Thus, the present invention provides a forensics tool for digital media to facilitate in eliminating piracy. This is accomplished, in part, by having each user assigned a separate ID. Different ID's can be represented by different keys. Also, different ID's can be represented by assigning different code-words to different users (e.g., each user can be assigned a different ID which is a binary string; then this string may be encoded using different keys of two groups, where one group represents binary 1 and the other represents binary 0). In one instance of the present invention, different keys are assigned to different users. Then, each user's copy is marked with a corresponding secret key. This produces mark-embedded output that is perceptually approximately the same as original. A marked video may then undergo some malicious and/or non-malicious changes. Malicious changes are done by attackers that aim to remove an embedded mark signal and/or to disable its detection. Ideally, a detector should resist all modifications which produce media that are perceptually approximately the same quality as an original. Once a pirated copy is encountered and given as an input to a detector, an original owner (if any) (and/or possibly a group of owners who have participated in the formation of received pirated media) can be found with a negligible possibility of a false positive.

Previous work on video watermarking includes various schemes, such as that proposed by researchers in Phillips Research, Eindhoven (see generally, G. Depovere, T. Kalker, J. Haitsma, M. Maes, L. de Strycker, P. Termont, J. Vandewege, A. Langell, C. Alm, P. Norman, G. O'Reilly, B. Howes, H. Vaanholt, R. Hintzen, P. Donnelly, A. Hudson, "The VIVA Project: Digital Watermarking for Broadcast Monitoring," Image Processing, 1999; ICIP 99; Proceedings; 1999 International Conference on; Volume: 2; 24-28 Oct. 1999; Page(s): 202-205 vol. 2). However, the present invention is significantly different from prior schemes as it treats media in general as an N-dimensional signal. Accordingly, the present invention incorporates an N-dimensional de-correlating transform for robustness and image hashing for temporal synchronization. Furthermore, the present invention's methodology substantially relies on embedding information on pseudo-randomly derived semi-global statistics, both for robustness and security purposes. This methodology does not exist in the prior art.

The present invention utilizes a secret key $K_i$ for user i and a cryptographically secure pseudo-random number generator (PRNG) in all randomized steps of the algorithm. One example of a cryptographically secure PRNG is RC4. One skilled in the art can appreciate that other secure PRNGs can also be used. For instance, let a given multimedia signal consist of separate "objects" $s_1, s_2, \ldots, s_M$, where M is a total number of objects. For example, in a video application, each frame can be treated as an object and M may denote the total number of frames in the video. Let N be a total number of customers. Accordingly, it is desirable to produce N different copies of the multimedia signal. Let $K_i$ be a secret key for user i, $1 \leq i \leq N$. Let K be a secret master key, which is different from $\{K_i\}_{i=1}^{N}$.

Assume a hash function $h_K(\bullet)$ which operates on objects $\{s_i\}$, and its range is $\{0,1\}^L$. The hash function is a pseudo-random operator, which is randomized by the secret key K. Let $d(\bullet,\bullet)$ denote a normalized Hamming distance (normalized by L, the length of the output hash value). Assume that:
1. $h_K(s_i)$ is approximately uniformly distributed in $\{0,1\}^L$ for each given i.
2. $Pr[(d(h_K(s_i), h_K(s_j)) \geq T_1] \approx 1$ for any $s_i$ and $s_j$, where $s_i$ and $s_j$ are perceptually different objects.
3. $Pr[d(h_K(s_i), h_K(s_i')) \leq T_0] \approx 1$ for any $s_i$ and $s_j$, where $s_i$ and $s_i'$ are perceptually approximately same objects.

Note that, the probability space is defined over different keys in the criteria above. For most practical purposes, $0 < T_0 < T_1 < 0.5$ and $T_0$ and $T_1$ are sufficiently far apart.

The mark embedding algorithm for user i ($1 \leq i \leq N$) is given as:
1. Choose P different locations, randomized by the master key K. Let $t_1, t_2, \ldots, t_P$ denote these locations, where $t_j \in \{1, 2 \ldots N\}$, $1 \leq j \leq P$.
2. Find and store the hash values $\{h_K(s_{t_j})\}_{j=1}^{P}$.
3. For each location $t_j$, consider a neighborhood around it with width $2\Delta_j + 1$, thereby find a region j, $t_j - \Delta_j$, $t_j - +\Delta_j + 1, \ldots, t_j + \Delta_j - 1, t_j + \Delta_j$, $1 \leq j \leq P$.
Now choose $\{\Delta_j\}_{j=1}^{P}$ pseudo-randomly using the master key K such that for all j, $2\Delta_j + 1 \leq R$ and region j does not overlap with region k for all $j \neq k$.
4. For each $1 \leq j \leq P$, replace $\{s_k\}_{k=t_j-\Delta_j}^{t_j+\Delta_j}$ with $\{s_k^{K_i}\}_{k=t_j-\Delta_j}^{t_j+\Delta_j} = W_{K_i}(\{S_K\}_{k=t_j-\Delta_j}^{t_j+\Delta_j})$ where $K_i$ is the secret key for user i and $W_{K_i}$ denotes the mark embedding function.

Note that step 1 in the algorithm above can be quite generic. In general, these P locations can be chosen totally pseudo-randomly. They can also be chosen pseudo-randomly among all possible "watermarkable" regions. One currently implemented instance of the present invention follows the latter approach. However, the present invention enhances this method by randomizing based on the master key, K, which produces a pseudo-random feature rather than a totally random feature as described supra. This aspect of the present invention is described in detail infra.

When choosing mark embedding areas, it is neither necessary nor secure to mark every single part of media. What is more, not all parts of the media will be suitable for mark embedding. In one instance of the present invention, an embedding area assignment module specifies locations of embedding in a random manner. Randomization in choosing the marked parts contributes to better security. But, at the same time, a quasi-homogeneous distribution of the mark embedding locations throughout the whole media is ensured so that randomness in the strict sense is not enforced but, instead, a near-random approach is taken. For this purpose, if a target number of embeddings are P, the media is broken into P/J pieces, which are of equal length. J is a number of embeddings in one piece. In another instance of the present invention, a location chooser module chooses random locations. If these locations satisfy two conditions outlined infra, it is assigned to be one of the embedding locations. The location chooser module operates until it finds J such embedding locations in each piece.

It should be noted that high entropy in host data ensures imperceptibility and security of marks embedded in media. A mark embedding area in media such as video, for example, is a number of consecutive frames which can be described as an N-dimensional signal (based on the representation domain), such as, for example, a three-dimensional signal (in the original pixel domain). Ideally, the entropy along all axes of this signal should be considered. However, doing so is computationally expensive. Furthermore, it is a known fact that change along a time axis is much less than a spatial axis. In general, more changes along an axis imply a signal contains more information along that axis; this can also be re-stated as the signal has more uncertainty or more entropy along that axis. Resulting from this observation, one of the conditions of being a mark embedding location (i.e., watermarkability criterion mentioned supra) is having enough change along the time axis, which approximately corresponds to having enough overall entropy according to the observations. For this purpose, hash values, for example, of video frames are utilized. For any mark embedding location $t_j$ compute:

$$\sum_{i=t_j-\Delta_j}^{t_j+\Delta_j} \sum_{l=t_j-\Delta_j}^{t_j+\Delta_j} d(h_K(s_i), h_K(s_l)) \text{ s.t. } i \neq l \quad \text{(Eq. 1)}$$

An approximation to this is applying the formula over a running sum with a shorter window size of 2C+1, such as:

$$\sum_{r=t_j-\Delta_j}^{t_j+\Delta_j} \sum_{i=-C}^{C} \sum_{l=-C}^{C} d(h_K(s_{r+i}), h_K(s_{r+l})) \text{ s.t. } i \neq l \quad \text{(Eq. 2)}$$

If this value is bigger than a user-specified threshold $TH_1$, the first condition is satisfied. Here the window size C is also a user-specified algorithm parameter.

As is elaborated further in the detector discussion infra, for time-synchronization, hash values are utilized. Hash values of a mark area are compared with hash values of an attacked version. In this comparison, together with a center frame of an embedding location, a number of randomly chosen frames from the mark area are utilized, which are called "poles." In order to have a more accurate matching during detection, it is better if pole frames are sufficiently different from frames in a close neighborhood. This is the second condition to satisfy for a mark embedding location (also known as watermarkability condition). It can be formulated as:

For any center point, $t_j$, satisfying the previously mentioned criterion:

$$\sum_{r=t_j-\Delta_j}^{t_j+\Delta_j} \sum_{i=-C}^{C} \sum_{l=-C}^{C} d(h_K(s_{r+i}), h_K(s_{r+l})) > TH_1 \quad \text{(Eq. 3)}$$

Apply the following algorithm:
1. Randomly choose Z locations $t_{jz} \in \{t_j - \Delta_j, \ldots, t_j + \Delta_j\}$, where $z=1, \ldots, Z$ and j denotes the index of the mark embedding area, $j=1, \ldots, P$
2. For each $t_{jz}$:

(a) if $\sum_{i=-C2}^{C2} \sum_{l=-C2}^{C2} d(h_K(s_{r+i}), h_K(s_{r+l})) > TH_2$ (Eq. 4)

declare it as a valid pole and go to item 2,
   else, $t_{jz} = t_{jz} + 1$ (b) if $t_{jz} \neq t_{j(z+1)}$ repeat item 2,
   else
   give up, declare as not having any value for pole z, go to item 1.
3. If the number of valid poles H is more than a fraction of a total number of target poles, that is if H>mZ (for example m=0.7), $t_j$ is accepted as an embedding location.

In the algorithm above, the threshold $TH_2$ and the window size C2 in step 2(a) are user-specified algorithm parameters and adjust the sensitivity of the algorithm.

Therefore, potential mark embedding locations should first satisfy a condition that ensures an existence of a sufficient amount of energy, which is implemented, in one instance of the present invention as Equation 3. The potential mark embedding locations should also have at least a specific number of valid poles according to the supra algorithm. Hash values of center points $\{h_K(s_{t_j})\}_{j=1}^{P}$ together with poles $\{h_K(s_{t_{jz}})\}_{j=1,z=1}^{P,H}$ in each embedding area are output and/or saved to be utilized in detection.

Figure 7:
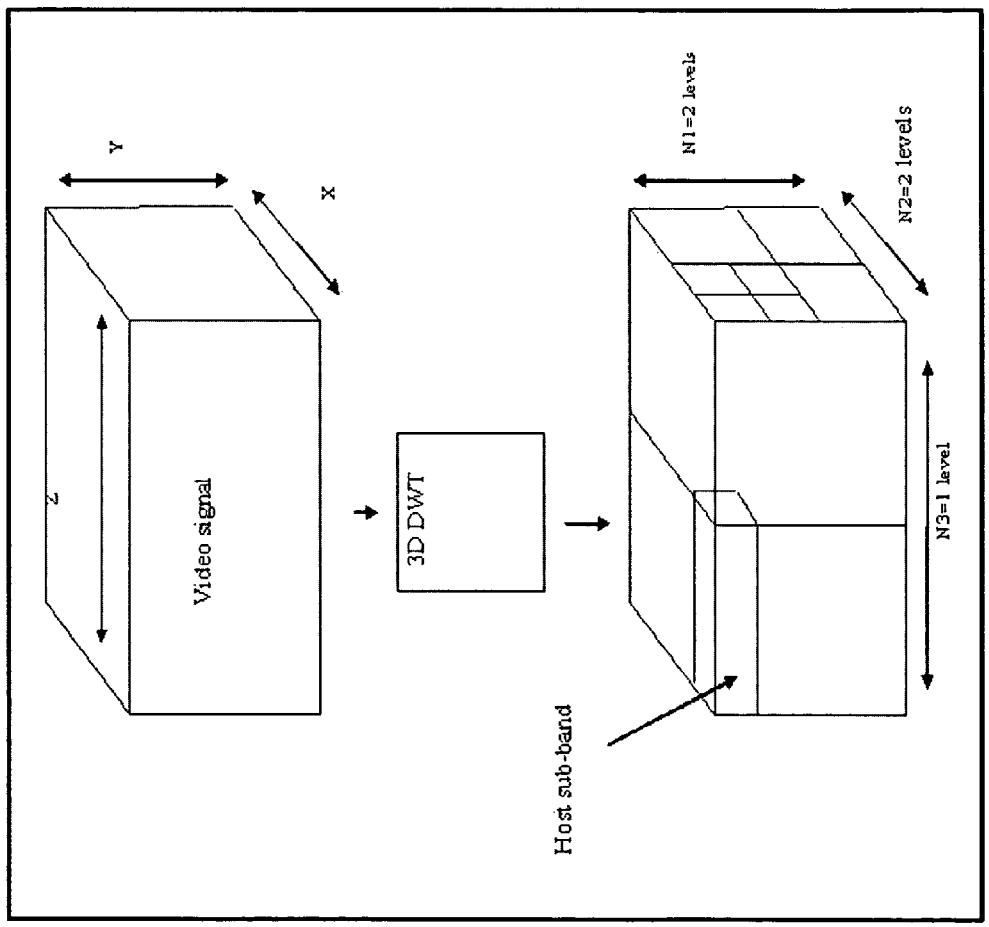
FIG. 7 is an illustration of a media signal transformation into an N-dimensional signal in accordance with an aspect of the present invention.

Once an embedding location is chosen, it is marked accordingly. Any mark embedding scheme with sufficient security properties can work on an approximately de-correlated version of a signal to provide robustness against attacks. For this purpose, in one instance of the present invention, an N-dimensional transform is applied such as, for example, a 3-dimensional DWT (Discrete Wavelet Transform). After transforming, the signal, in this instance of the present invention, is decomposed into N1 and N2 levels on vertical and horizontal axes and N3 levels on the temporal axis. The lowest frequency sub-band is chosen along all dimensions as the sub-band, in this instance of the present invention, where a mark is to be embedded as it has the most significant amount of energy. However, other sub-bands (possibly jointly with or without the lowest frequency sub-band) can also be used for mark embedding purposes. One such implementation utilizes the Podilchuk decomposition (see generally, C. I. Podilchuk, N. S. Jayant and N. Farvardin, "Three-Dimensional Subband Coding of Video," IEEE Transactions on Image Processing, Volume: 4 Issue: 2, February 1995 Page(s): 125-139) as illustrated in FIG. 7. In this illustration 700, a 3-dimensional wavelet transform is utilized to transform media which is then pseudo-randomly separated into rectangular prisms (i.e., objects). Furthermore, other 3-dimensional signal processing transforms can be applied as well; for instance, another instance of the present invention can apply 3-dimensional DCT (discrete cosine transform) and select some frequency bands and embed marks in these bands accordingly.

Figure 8:
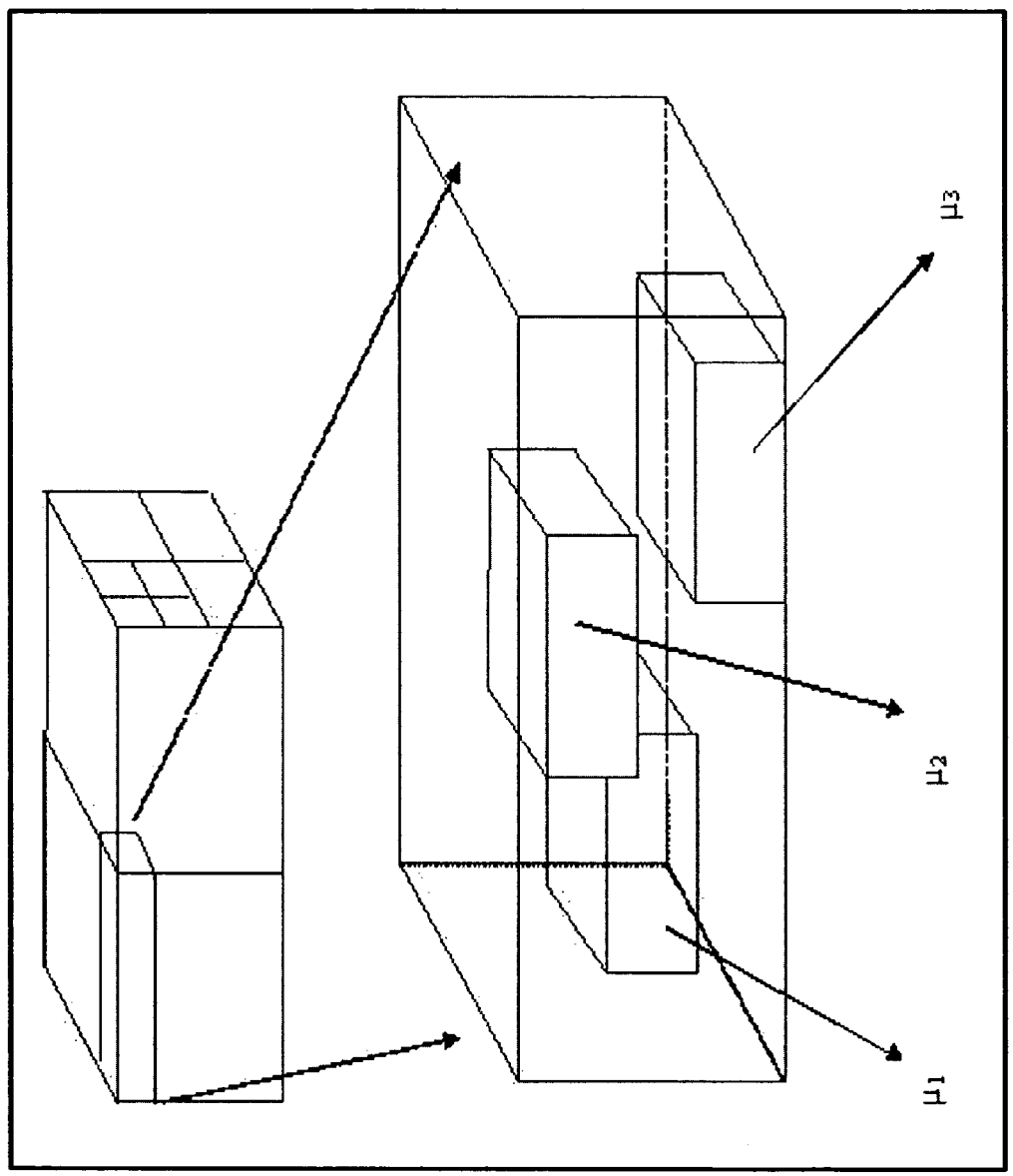
FIG. 8 is an illustration of pseudo-randomly chosen prisms from a lowest frequency sub-band in accordance with an aspect of the present invention.

Marks are embedded by changing the statistics of a group of entities, such as, for example, coefficients contained in sub-band objects such as, for example, rectangular prisms whose sizes and locations are chosen pseudo-randomly. See FIG. 8 for an illustration 800 of pseudo-randomly chosen prisms from a lowest frequency sub-band.

Once the location and size of an object such as, for example, a prism is determined, each entity, such as, for example, a pixel in the prism, is assigned pseudo-random weights, which are chosen from a zero-mean correlated Gaussian distribution. Each weight is multiplied with the corresponding entity and the sum of these products yields a pseudo-random linear statistic for each object. The statistics of object i, $\mu_i$, $1 \leq i \leq N$ (where N is the total number of objects) is quantized via a scalar uniform quantizer with step size $\delta$. Other high dimensional vector quantization mechanisms can also be applied. Let the output of the quantization be $\hat{\mu}_i$, $1 \leq i \leq N$.

When embedding a mark in a host, let s denote the original unmarked host data. A pseudo-randomly generated watermark signal n, is found such that the statistics of the marked signal x=s+n are equal to $\hat{\mu}$ and $\|x-s\|$ is minimized possibly subject to some conditions, such as smoothness, etc. First define:

$$d \in \Re^M : d \triangleq \hat{\mu} - \mu,$$

$$T \in \Re^{M \times N} : T_{ij} \triangleq \begin{cases} c_{ij} & \text{if } j \in R_i, \\ 0 & \text{else,} \end{cases}$$

where T is chosen such that $Ts = \mu$.
Let $n \triangleq x - s$.
Solving:

$$\min_x \|x - s\| \text{ s.t. } Tx = \hat{\mu} \quad \text{(Eq. 5)}$$

which is equivalent to:

$$\min_n \|n\| \text{ s.t. } Tn = d. \quad \text{(Eq. 6)}$$

yielding the disturbance that achieves the goal with minimum L2 norm.
The solution is given by $n=T^T(TT^T)^{-1}d$, which yields:

$$x = s + T^T(TT^T)^{-1}(\hat{\mu}-\mu) \quad \text{(Eq. 7)}$$

(See generally, M. K. Mihcak, R. Venkatesan and M. Kesal, "Watermarking via Optimization Algorithms for Quantizing Randomized Statistics of Image Regions," Proceedings of the Fortieth Annual Allerton Conference on Communication, Control and Computing, Monticello, Ill., October 2002.).

Equation 3 is optimal in the sense of a Euclidean norm, however, this does not necessarily guarantee an imperceptible media output. In order to improve the perceptual quality, another constraint is imposed: an added mark is required to be approximately band-limited together with the condition of Equation 2.

To satisfy these conditions, the following algorithm is utilized:
1. $n_{MN} = T^T(TT^T)^{-1}$
2. set $n_0 = n_{mN}$
3. for K steps:
    3.1. $n_1$ = smooth (no cutoff frequency)
    3.2. $n_2 = n_1 - n_{MN}$
    3.3. project $n_2$ onto N(T), where N(T) denotes the nullspace of T: $n_3 = n_2 - T^T(TT^T)^{-1}Tn_2$
    3.4. set $n_0' = n_3 + n_{MN}$
    3.5. if $\|n_0' - n_0\| < \epsilon$ stop, else set $n_0 = n_0'$ and Go to 3.1.

The function smooth at 3.1 can be the ideal low pass filter which employs a Fourier transform to smooth out an input signal. It can also be any other possibly non-linear smoothing operator (e.g., median filtering, other noise-removal based algorithms from computer vision, etc.). If the smooth function is the ideal low pass filter, the parameter cutoff frequency controls how smooth a signal is. Furthermore, in the smooth function, appropriate scaling is also applied such that the output has a fixed sup norm; otherwise the maximum absolute value of the disturbance may be diminished at each of the iterative algorithms given above. Alternatively, any norm (e.g., $L_p$, in general, $p=1, 2, \ldots$) can be fixed in the smooth function instead of the sup norm.

In order to be robust against scaling type of attacks, a pre-processing before mark embedding is utilized as an option, which is followed by an optional post-processing. Both pre- and post-processing are point operators (modifications based on an entity's value such as, for example, a pixel value so as to change the distribution of the entities) on individual entities in the spatial domain. During detection, a similar optional point operator based pre-processing is utilized prior to applying a detection algorithm.

In one instance of the present example, a pixel value histogram of each frame which is utilized in a video embedding scheme is first recorded. Then histogram equalization is applied on each frame. A mark is embedded on a version of a media signal which is composed of the histogram equalized frames. After the embedding and utilizing the original pixel value distributions which were saved, the processed frames are mapped back to their original distribution. During detection, histogram equalization is applied on each of the frames and the resulting media signal is then processed.

In another exemplary implementation of an instance of the present invention, a slightly different technique is used. The reason for this technique is that observations indicate that if the histogram of the considered frame is unevenly distributed, perceptually annoying artifacts are sometimes found if the technique in the previous paragraph is employed. Let $h(i)$, $0 \le i \le 255$ be the normalized histogram of the considered frame, i.e., $$\sum_{i=1}^{255} h(i) = 1.$$

The pixels are separated into two groups, say A and B, using an algorithm and apply pre- and post-processing only to one of these groups. These sets are determined using the following algorithm, where $0 < pp \ll 1$ and N are user-specified algorithm parameters (e.g., pp=0.01, N=15):
1. Initialize j=255.
2. Decrement j by 1 until $h(j) > pp$, at that point let j'=j.
3. Beginning from j=j', decrement j by 1 until $|S_j|=N$, where $|S_j| = \{l | j < l < j' \text{ and } h(l) > pp\}$. At that point let j"=j.
4. Beginning from j=j", increment j by 1 until $h(j) < pp$. At that point, set $T_1 = j$.
5. Initialize k=0.
6. Increment k by 1 until $h(k) > pp$, at that point let k'=k.
7. Beginning from k=k', increment k by 1 until $|R_k|=N$, where $R_k = \{l | k' < l < k \text{ and } h(l) > pp\}$. At that point let k"=k.
8. Beginning from k=k", decrement k by 1 until $h(k) < pp$. At that point, set $T_2 = k$.
9. The set A is defined as $A = \{I(i,j) | T_2 < I(i,j) < T_1\}$, where $I(i,j)$ is the value of the $(i,j)^{th}$ pixel of the unmarked image I (representing the frame of interest). The set B is its complement.

The pre-processing stage consists of applying histogram equalization to the pixels that are elements of the set A. No processing is applied to the pixels that are elements of the set B. At the mark embedding stage, watermark embedding is applied after applying histogram equalization to the elements of set A. After doing the mark embedding, invert the point operator (i.e., the inverse mapping of the histogram equalization) to the pixels which were originally in the set A prior to mark embedding. This constitutes the post-processing operation at the embedder. At the detector, histogram equalization is applied to the pixels that originally, location-wise, belonged to set A of the unmarked media; this location information is sent as side information to the detector. Furthermore, at the detector, the pixels are replaced that originally, location-wise, belonged to set B with their original unmarked values. Note that, although this replacement decreases detector performance somewhat, it is negligible since the cardinality of the set B constitutes about 1% of the total number of pixels in a frame per this instance of the present invention's choice of algorithm parameters. On the other hand, such replacement experimentally proves to be extremely useful in case of random histogram equalization, scaling, dynamic range processing, etc. type of attacks.

In order to detect a particular user, it is decided that user i has been involved in a production of a detector input if the detector output, utilizing a key $K_i$, exceeds a chosen threshold $\tau$. A corresponding high level multimedia watermark detector is described as follows:

Let the input to a detector be a media signal that consists of objects $x_1, x_2, \ldots x_{M'}$. Note that in general $M' \ne M$, where M is the number of the objects in the original media (which is equal to the number of the objects in the mark-embedded media). Next, a detection algorithm is given as:

1. For all $1 \leq M'$, compute hash values of a received signal $h_K(x_j)$.
2. For each $1 \leq j \leq M'$, do the following:
   (a) If there exists a $t_k$, $1 \leq k \leq P$, such that $d(h_K(x_j), h_K(s_{t_k})) < T_0$, then proceed to the next step.
   (b) For all $K_i$, $1 \leq i \leq N$ run watermark detection algorithm on the width $2\Delta_k+1$ region around $t_k$: Compute $d_i = D_{K_i}(\{x_j\}_{j=t_k-\Delta k}^{t_k+\Delta k})$, $1 \leq i \leq N$. Here the function $D_{K_i}$ represents the watermark detection algorithm that uses key $K_i$ on the corresponding region of objects.
   (c) For each $1 \leq i \leq N$, if there exists at least one i such that $d_i=1$, declare that user i's mark has been found in the received input.

In the present invention, step 2(a) is changed and improved as elaborated infra.

Media often goes through changes that sometimes cause a time synchronization problem during mark detection. In other words, a mark embedding area in original media might not be at the same time point in an attacked version. Any kind of time axis attack, like scene insertions, changes and swaps, time-decimation and interpolation and shifts, is a significant threat on the accuracy and robustness during detection.

As mentioned supra, hash values of a center of mark embedding region together with pole frames in a mark embedding area are determined and saved during mark embedding. These values are utilized to lock a detector to the correct position in attacked media (or any other received media for that matter if locking is at all possible). In order to accomplish this in a computationally efficient and accurate way, the following algorithm is utilized:

For each mark embedding region j,
1. Find $\{s^{jh}\}_{h=1}^H$ s.t. $s_{jk} = \{i | d(h_K^i, a_{jk}) < T\}$
2. Represent indices of a set $s_{jk}$ with $i_{1,k}, i_{2,k}, \ldots, i_{|s_{jk}|,k}$
3. Identify all -tuples which satisfy a temporal distance criterion which is $t_d(a_{jk}, a_{mn}) - \epsilon < |i_{jk} - i_{mn}| < t_d(a_{jk}, a_{mn}) + \epsilon$ where $a_{i,j}$ is a $j^{th}$ pole at region i at an embedding and $t_d(a_{i,j}, a_{mn})$ is a temporal distance in terms of number of frames between $a_{i,j}$ and $a_{mn}$. K-tuple with a minimum total hamming-distance from the original poles is utilized to synchronize a detector input with an original.

Step 1 is achieved, in one instance of the present invention, by utilizing the following dynamic programming algorithm scheme.

In a basic detector scheme, a detector is semi-blind: It uses statistics of an original signal and its quantized version for each key. A correlation value is given by:

$$\text{Correlation} = \frac{<\mu_i^a - \mu_i, \hat{\mu}_i - \mu_i>}{\|\hat{\mu}_i - \mu_i\|^2} \quad \text{(Eq. 8)}$$

where $\mu_i^a$ are statistics of an input signal determined by a detection key $K_i$. This detection is done for all user keys. When a user's correlation value exceeds $\tau$, that user is declared to be involved in the production of the detector input. In another instance of the correlation detector implementation, weights can be assigned to the rectangles statistics before computing the inner product in the numerator of Eq. 8. This can be done for several reasons. One instance of the present invention can include the statistic $\mu_i^a$ only if it is sufficiently close to the unmarked original statistic $\mu_i$. This approach improves the performance of the correlation detector especially in case of geometric attacks; if $\mu_i^a$ is at a large distance from $\mu_i$, then this implies the correct rectangle location has not been chosen topologically possibly due to a geometric attack. This can be achieved, for instance, only including the statistics $\mu_i^a$ in the computation of the inner product if $|\mu_i^a - \mu_i|$ is less than a user-specified threshold. Furthermore, a weighting function can be assigned in the computation of the inner product, where the weights are inversely proportional with $|\mu_i^a - \mu_i|$. Moreover, these weights can also be chosen pseudo-randomly from a distribution to increase the security level of the system.

Depending on the type of attack, one of the reasons for low detector performance is de-synchronization introduced along the spatial axis. This is especially true for cropping/resizing rotation type of geometric attacks along the spatial axis. One way to get better results during detection is to search over as many parameters as possible. Generally, any of these attacks can be modeled as a general affine transform, $y = Ax + b$ where x is a 2×1 vector that represents the coordinate of the image pixel, y is a 2×1 vector that represents the coordinate of the attacked image pixel, A is a 2×2 reshaping transform matrix and b is a 2×1 translation vector. Searching over all the possible parameters is restrictive. One instance of the present invention carries out the search only on b approximating A as the identity matrix; however, a search can be performed both in the space of A and b in general. Furthermore, similarly, a search can be performed to overcome small temporal de-synchronization modifications.

Many of these attacks need to be applied to an entire object of the media. Effects, in a local sense, can be approximated as a translation. As building blocks of the present invention's mark embedding scheme are blocks all over an object, each block is affected as if the change was approximately only a translation change. Rotational attack around the center of an object would be a good example of this.

In order to be robust to collusion types of attacks, pre-processing of media in the form of intentional pseudo-random de-synchronizations is employed. Thus, it is difficult for colluders to align prior to collusion (e.g., averaging). In a size-K collusion, all the K colluders are assumed to need to align almost perfectly prior to averaging; otherwise averaging introduces perceptually annoying artifacts. The present invention's changes are small enough so users do not notice a difference, but obvious enough so that attackers will first need to align the marked media before utilizing them in an attack. An example of intentional pseudo-random de-synchronization for media is pseudo-random time-compression (i.e., decimation and interpolation) of the media at random locations with random amounts, rotations of small pseudo-random amounts at pseudo-random locations, etc. Each pseudo-random intentional de-synch utilizes each user's key as a seed of a pseudo-random number generator; thus, an intentional de-synch has a high probability of being different for each user. One instance of the present invention utilizes the following method for pseudo-random time compression.

Figure 9:
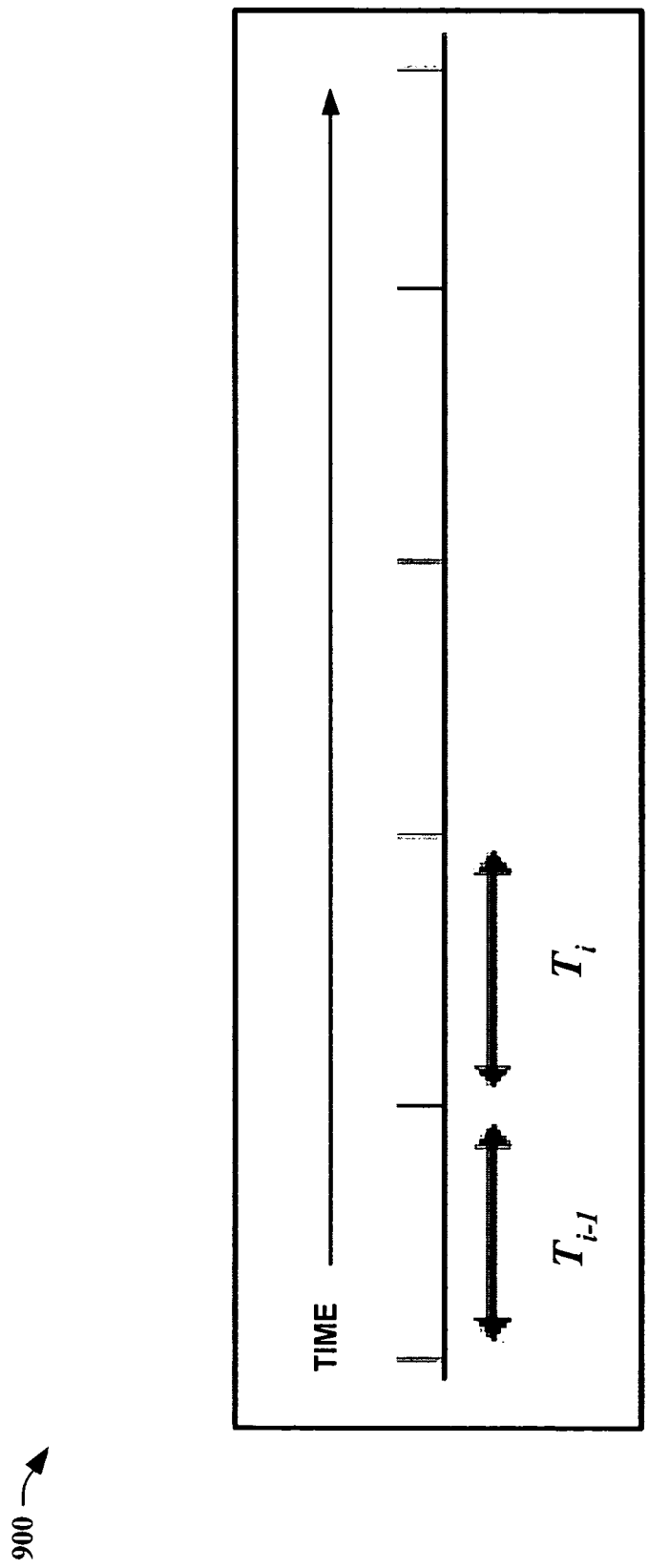
FIG. 9 is an illustration of pseudo-random partitioning of a media signal in accordance with an aspect of the present invention.

A media signal, such as, for example, a video signal is partitioned along a time axis with chunks of different lengths, $T_i$, for chunk i, which are determined in a pseudo-random fashion as shown in illustration 900 of FIG. 9. For all i, a pseudo-random perturbation is introduced on $T_i$ so that the final length $T_i'$ is uniformly chosen from $[T_i - d, T_i + d]$, where d is the maximum allowable change in terms of number of frames. Using Fourier transform based interpolation, $T_i$ frames are mapped to $T_i'$ frames:

$$T_i \to T_i' \text{ where } T_i' \in [T_i - d, T_i + d] \quad \text{(Eq. 9)}$$

In a user's expectation sense, the total length of the video does not change. Similar to the change along the time axis, intentional changes could be introduced in the spatial axes. For example, every frame could be pseudo-randomly rotated with respect to the previous frame and cropped with varying amounts and resized back to the original size. Naturally cropping and rotation amounts should change smoothly in time. This way, even in one frame, with high probability there are differences from one user to another, which will make it harder for attackers to collude.

Not every frame or group of frames is suitable for applying de-synch. When there is a significant amount of change from one frame to another or when there is a scene change, applying the scheme above would cause visual artifacts. Accordingly, the intentional de-synch locations need to be chosen appropriately.

Application to Fingerprinting:

Actual fingerprinting of media is now discussed in relation to random assignments such as:

Assigning a different key to each user

Brute force detecting (with Collusion Resistance analysis)

It is assumed that there exists a key-based watermarking scheme for a particular measure of media such as, for example, a length of video. Let s be an original unmarked source. Let $\mu_i$ be a statistics vector of s obtained by a key $K_i$ (i.e., when $K_i$ is used as a seed of a secure pseudo-random number generator, pseudo-random regions and pseudo-random weights are chosen which lead to the computation of $\mu_i$). After mark-embedding using the key $K_i$ a marked source is denoted as $x_i$. Accordingly, let $\hat{\mu}_i$ represent the statistics vector of $x_i$ obtained by the key $K_i$. Let $\mu_i^j$ be the statistics vector of $x_j$ obtained by the key $K_i$ (where $x_j$ is the mark-embedded version of s using the key $K_j$). Note that $\mu_i^i = \hat{\mu}_i$.

In one instance of the present invention, a normalized correlation is utilized during detection. A presence of $\{\mu_i, \hat{\mu}_i\}$ is assumed during detection for all i. All possible keys are assumed to be exhaustively tried during detection. Let $x_j$ be an input to a detector and suppose that the detector output is computed using the key $K_i$. Then compute:

$$C_{ij} \triangleq \frac{<\mu_i^j - \mu_i>}{\|\hat{\mu}_i - \mu_i\|^2}. \quad \text{(Eq. 10)}$$

Thus, a detection rule is as follows: User i has been involved in the production of the detector input if the detector output using the key $K_i$ exceeds a chosen threshold $\tau$.

In another instance of the present invention, a mark embedding algorithm for user i ($1 \leq i \leq N$) is given below:

1. Choose P different embedding locations, randomized by a master key K and chosen as explained supra. Let $t_1, t_2, \ldots, t_P$ denote these locations, where $t_j \in \{1, 2 \ldots N\}$, $1 \leq j \leq P$.
2. Choose P' different de-synch locations, randomized by a master key K'. Let $t_1', t_2', \ldots, t_{P'}$ denote these locations, where $t_j' \in \{1, 2 \ldots P'\}$, $1 \leq j \leq P'$.
3. Using a master key as the seed of a secure pseudo-random number generator, create two groups of keys, group0=$\{K_1^0, \ldots, K_P^0\}$ and group1=$\{K_1^1, \ldots K_P^1\}$.
4. Pre-compute:
    (a) $WM_{K_i^j}(s_{t_p})$ where $j \in \{0,1\}$, $i \in \{1, 2, \ldots, P\}$, $p \in \{1, 2, \ldots, P\}$, here $WM_{K_i^j}$ is a mark embedding function.
    (b) $DE_{\overline{K}_i}(d_1)$ $i \in \{1, 2, \ldots, P'\}$ (one of the de-synch keys), here $DE_{\overline{K}_i}$ is the intentional pseudo-random de-synch function.

Embedding algorithm:

1. Given L bits $\{b_i\}_{i=1}^L$ for a user, L<P, derive the assigned codeword bits $c_i$, $1 \leq i \leq P$ for user i by adding redundancy via an error correction code (if L=P, the error correction code mapping is simple identity mapping).

2. For location l, $1 \leq l \leq P$, choose $WM_{K_i^0}(s_{t_l})$ if $c_1=0$, choose $WM_{K_i^1}(s_{t_l})$ if $c_1=1$.
3. Appropriately combining the watermark embedded and intentionally de-synched locations, produce the user's copy.

The decoding algorithm simply performs detection by all the group0 and group1 keys and decodes the most likely bit at location l, $1 \leq l \leq P$. Then error correction decoding (inverse mechanism of the error correction encoding applied in step 1 above) is applied to find out the most likely decoder user for the input media.

Collusion Resistance

In determining collusion results utilizing the present invention, define:

$$w_i \triangleq \hat{\mu}_i - \mu_i,$$

$$n_i^j \triangleq \mu_i^j - \mu_i, i \neq j$$

Assuming:

$$<n_i^j, w_j> \sim \mathcal{N}(0, W^2 \sigma_\epsilon^2),$$

For a given i, $\{N_i^j\}$ are independent for all j.

Note that the second assumption is mild if there are sufficiently many regions, and these regions are sufficiently large.

False Positives:

An event of false positive is defined as an event of $C_{i,j} > \tau$ for a given $i \neq j$. Assume that $\tau$ is chosen such that $\Pr(C_{i,j} > \tau)$ is sufficiently small.

Averaging Attack:

Suppose users $1, 2, \ldots K$ collude and apply averaging attack to $\{x_I\}_{I=1}^k$. The output of the averaging attack is $$\tilde{x}(K) \triangleq \frac{1}{K} \sum_{i=1}^K x_i.$$

Let $\tilde{\mu}_i(K)$ be the statistics vector of $\tilde{x}(K)$ obtained by the key $K_i$ where user i is one of the colluders. Now:

$$\tilde{\mu}_i(K) = \mu_i + \frac{1}{K}\left[w_i + \sum_{j \neq i} n_i^j\right], \quad \text{(Eq. 11)}$$

which leads to:

$$\tilde{\mu}_i(K) - \mu_i = \frac{1}{K}\left[w_i + \sum_{j \neq i} n_i^j\right]. \quad \text{(Eq. 12)}$$

Let the detector output be $C_i(K)$ when the input is $\tilde{x}(K)$ and key $K_i$ is used. Then:

$$C_i(K) = \frac{1}{W}\left[\frac{1}{K}\left(W + \sum_{j \neq i} <n_i^j, w_i>\right)\right], \quad \text{(Eq. 13)}$$

$$= \frac{1}{K} + \frac{1}{KW}\sum_{j \neq i} <n_i^j, w_i>,$$

$$= \frac{1}{K} + \frac{1}{K}\sum_{j \neq i} C_{ij},$$

where $C_{i,j} \sim \mathcal{N}(0, \sigma_\epsilon^2)$ per the second assumption; recall that $C_{i,j}$ was defined in (Eq. 10). Next, define:

$$\gamma \triangleq E[C_{i,j} C^{ik}], \quad \text{(Eq. 14)}$$

which assume is the same for all i, j, k. Now:

$$\forall i, E[C_i(K)] = \frac{1}{K}, \quad \text{(Eq. 15)}$$

and for all i, $$\text{Var}[C_i(K)] = \frac{1}{K^2} \text{Var}\left(\sum_{j \neq i} C_{ij}\right), \quad \text{(Eq. 16)}$$

$$= \frac{1}{K^2}\left|(K-1)\sigma_\epsilon^2 + 2\binom{K-1}{2}E|C_{ij}C_{ik}|\right|,$$

$$= \frac{K-1}{K^2}\sigma_\epsilon^2 + \frac{(K-1)(K-2)}{K^2}\gamma,$$

$$\sim \frac{\sigma_\epsilon^2}{K} + \gamma.$$

Consequently:

$$C_i(K) \sim \mathcal{N}\left(\frac{1}{K}, \frac{\sigma_\epsilon^2}{K} + \gamma\right). \quad \text{(Eq. 17)}$$

Next, consider the event of no-catch. The "no-catch" event occurs if a detector misses all the colluders in a collusion of size K. In a collusion of size K, colluder i is caught if $C_i(K) > \tau$ and colluder i is missed if $C_i(K) < \tau$. Thus:

Pr[no−catch]=(Pr[missing colluder i])$^K$, $$\Pr[\text{no} - \text{catch}] = (\Pr[\text{missing colluder } i])^K, \quad \text{(Eq. 18)}$$

$$= \left[1 - Q\left(\frac{\tau - \frac{1}{K}}{\sqrt{\frac{\sigma_\epsilon^2}{K} + \gamma}}\right)\right]^K.$$

where (Eq. 18) follows from (Eq. 17) and:

$$Q(x) \triangleq \int_x^\infty \frac{1}{\sqrt{2\pi}} e^{-t^2/2} dt. \quad \text{(Eq. 19)}$$

Mark Embedding at Different Locations:

Consider a scenario where the mark embedding is done at L different locations of a streaming multimedia. In that case, the no-catch event happens if the detector misses all the colluders at all the L locations. Thus, for K colluders:

$$\Pr[\text{no} - \text{catch}] = \left[1 - Q\left(\frac{\tau - \frac{1}{K}}{\sqrt{\frac{\sigma_\epsilon^2}{K} + \gamma}}\right)\right]^{KL}. \quad \text{(Eq. 20)}$$

Intentional De-Synchronization:

Next, the present invention introduces intentional pseudo-random de-synchronizations to a streaming multimedia (e.g., video) to make it difficult for the colluders to align prior to averaging. In a size-K collusion, assume that all the K colluders need to align almost perfectly prior to averaging; otherwise averaging introduces perceptually annoying artifacts. An example of intentional pseudo-random de-synchronization for video would be pseudo-random time-compression (i.e., decimation and interpolation) of the video at random locations with random amounts, rotations of small pseudo-random amounts at pseudo-random locations, etc. Each pseudo-random intentional de-synch utilizes each user's key as a seed of the pseudo-random number generator; thus, the intentional de-synch is different for each user with a high probability. Now, assume that two users align almost perfectly with probability $\theta < 1$ because of an upper bound on their computational resources. Then, K users would align perfectly with probability $\theta^K$. In that case:

$$\Pr[\text{no} - \text{catch}] = \theta^{KL}\left[1 - Q\left(\frac{\tau - \frac{1}{K}}{\sqrt{\frac{\sigma_\epsilon^2}{K} + \gamma}}\right)\right]^{KL}. \quad \text{(Eq. 21)}$$

Forensic Fingerprinting Statistics:

Yet another instance of the present invention provides a practical video fingerprinting scheme utilizing statistics-quantization after applying a three-dimensional decorrelating wavelet transform to media such as, for example, a video. As an example, a four second long video clip was utilized for testing. Various simulations were done with 300 frames of video where a watermark was embedded starting from the 100$^{th}$ frame and embedded in the next 128 frames (approx. 4 seconds, 30 frames/second). The test video was 288×352 CIF resolution Stefan sequence, which is classified as a C class video with high motion and texture details. Current C implementation of the system, which is not optimized, takes about 6 minutes to embed 128 frames watermark to the mentioned video. Detection takes less than 30 seconds.

Figure 10:
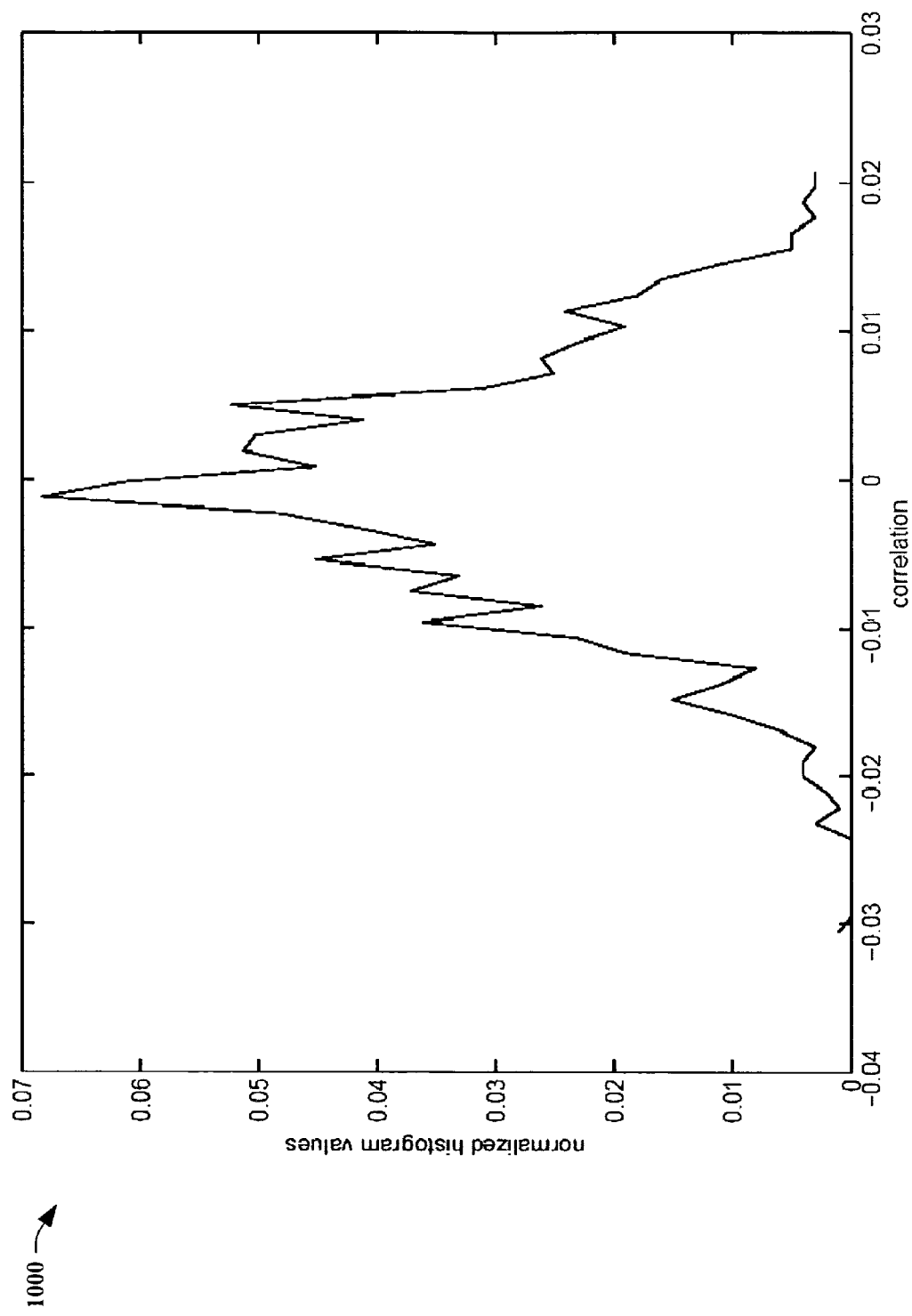
FIG. 10 is a graph of a histogram of a correlation distribution with differing keys in accordance with an aspect of the present invention.

In FIG. 10, a histogram 1000 shows a correlation distribution when an encoder uses $K_i$ and decoder uses $K_j$ where $i \neq j$. The distribution can be modeled as a Gaussian with zero mean and standard deviation $\sigma_\epsilon$ of 0.081. An event of false positive is defined as an event of $C_{i,j} > \tau$ for a given $i \neq j$, where $C_{i,j}$ is a correlation value when a video is marked with $K_j$ and decoded with $K_i$. It is assumed that $\tau$ is chosen such that $\Pr(C_{i,j} > \tau)$ is sufficiently small. Considering this distribution, in order to have a false positive probability $\Pr(C_{i,j} > \tau) < 10^{-6}$, $\tau$ is chosen such that $\tau > 0.0385$.

Figure 11:
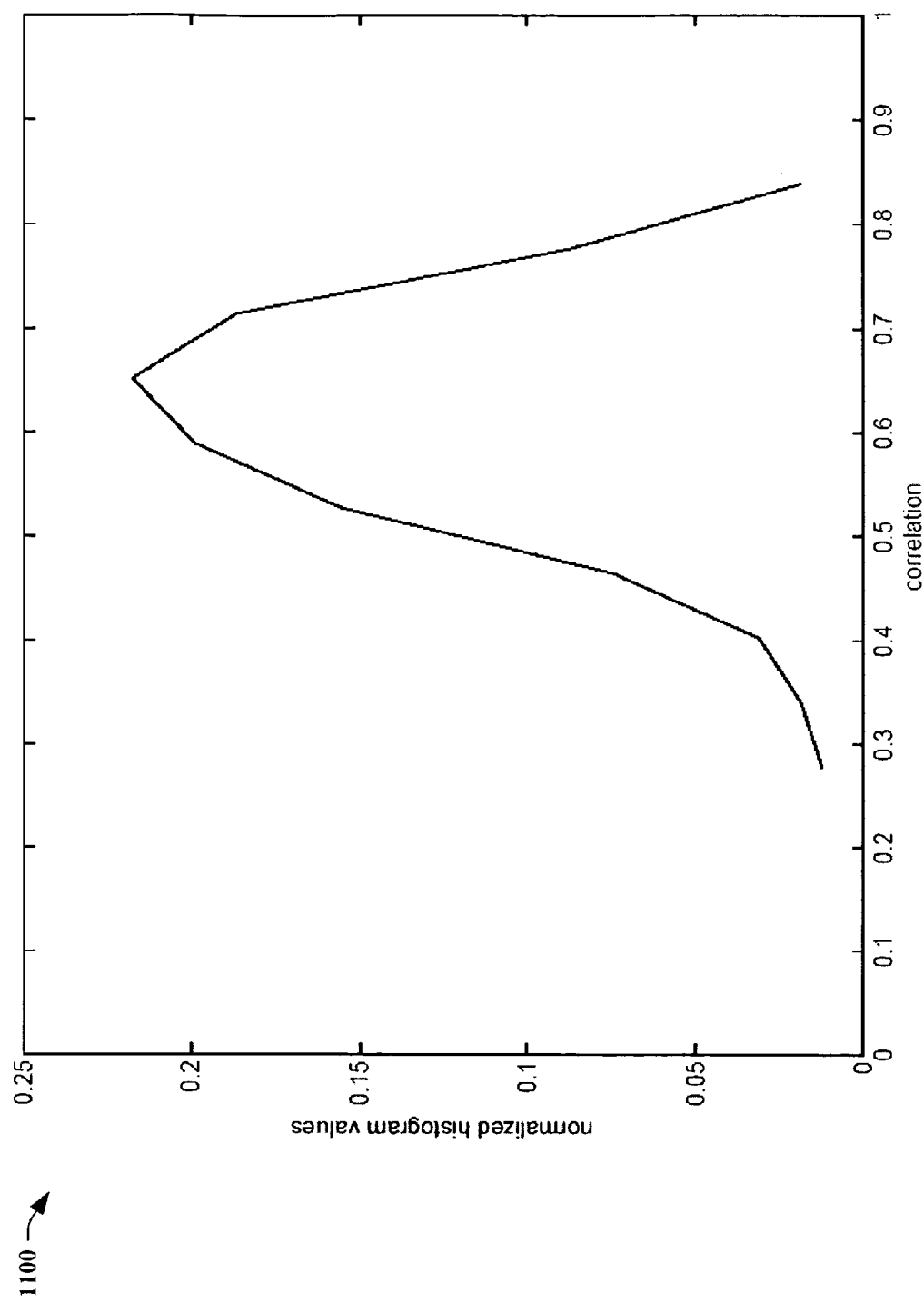
FIG. 11 is a graph of a histogram of a frame shifting attack in accordance with an aspect of the present invention.

In FIG. 11, a histogram 1100 of the detector output is illustrated for an attack where a watermarked signal was shifted two frames along the time axis. Distribution has a mean of 0.61 with a std of 0.11. Using an exhaustive search at the decoder (trying different amounts of shift along the time axis), this type of attack could be resisted.

Figure 12:
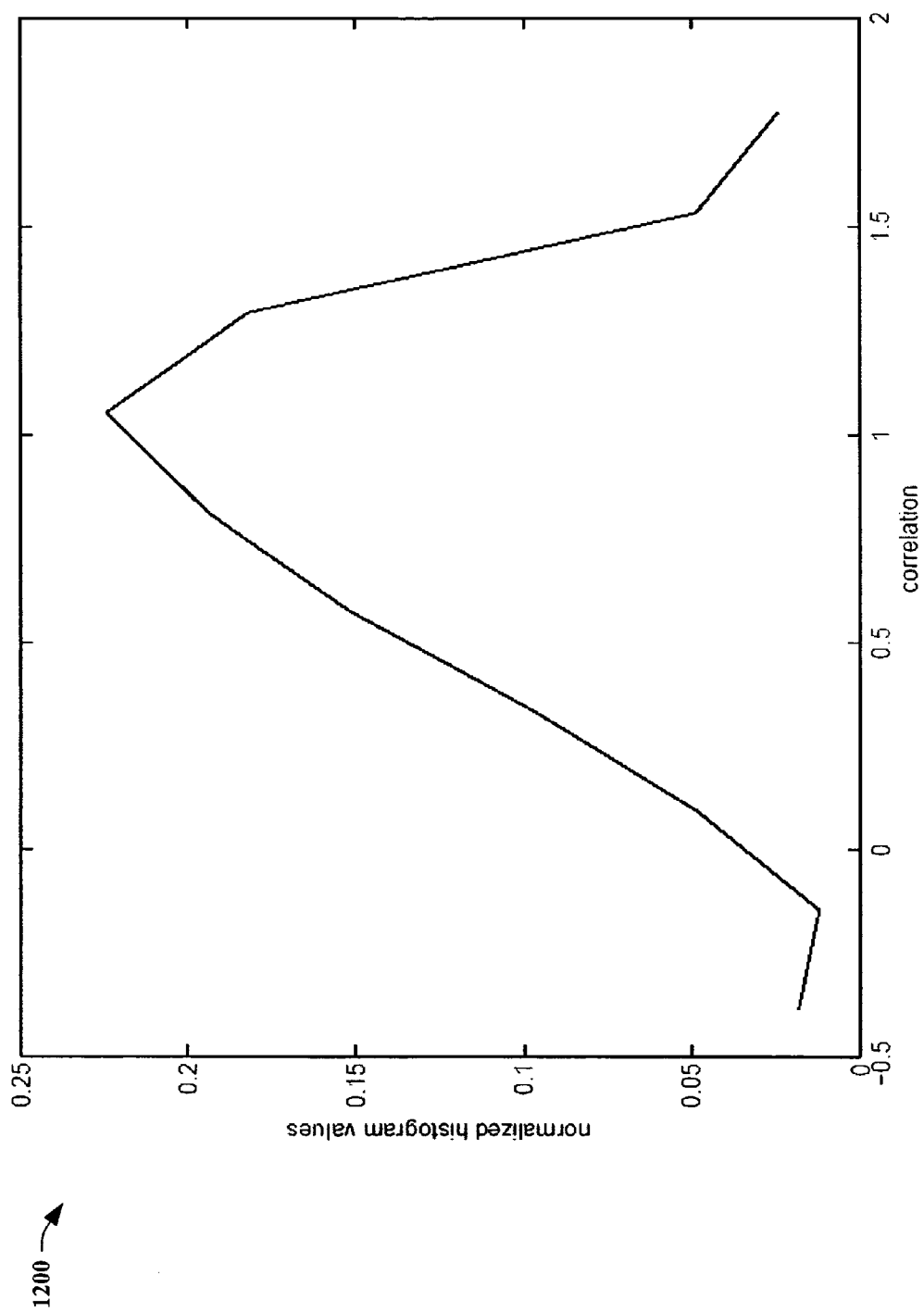
FIG. 12 is a graph of a histogram of a cropping attack in accordance with an aspect of the present invention.

In FIG. 12, a histogram 1200 is shown of the detector output for video signals which were cropped from each side by 20 pixels but not resized, instead the cropped parts are replaced with zero values. The distribution has a mean of 0.87 and std of 0.44.

Figure 13:
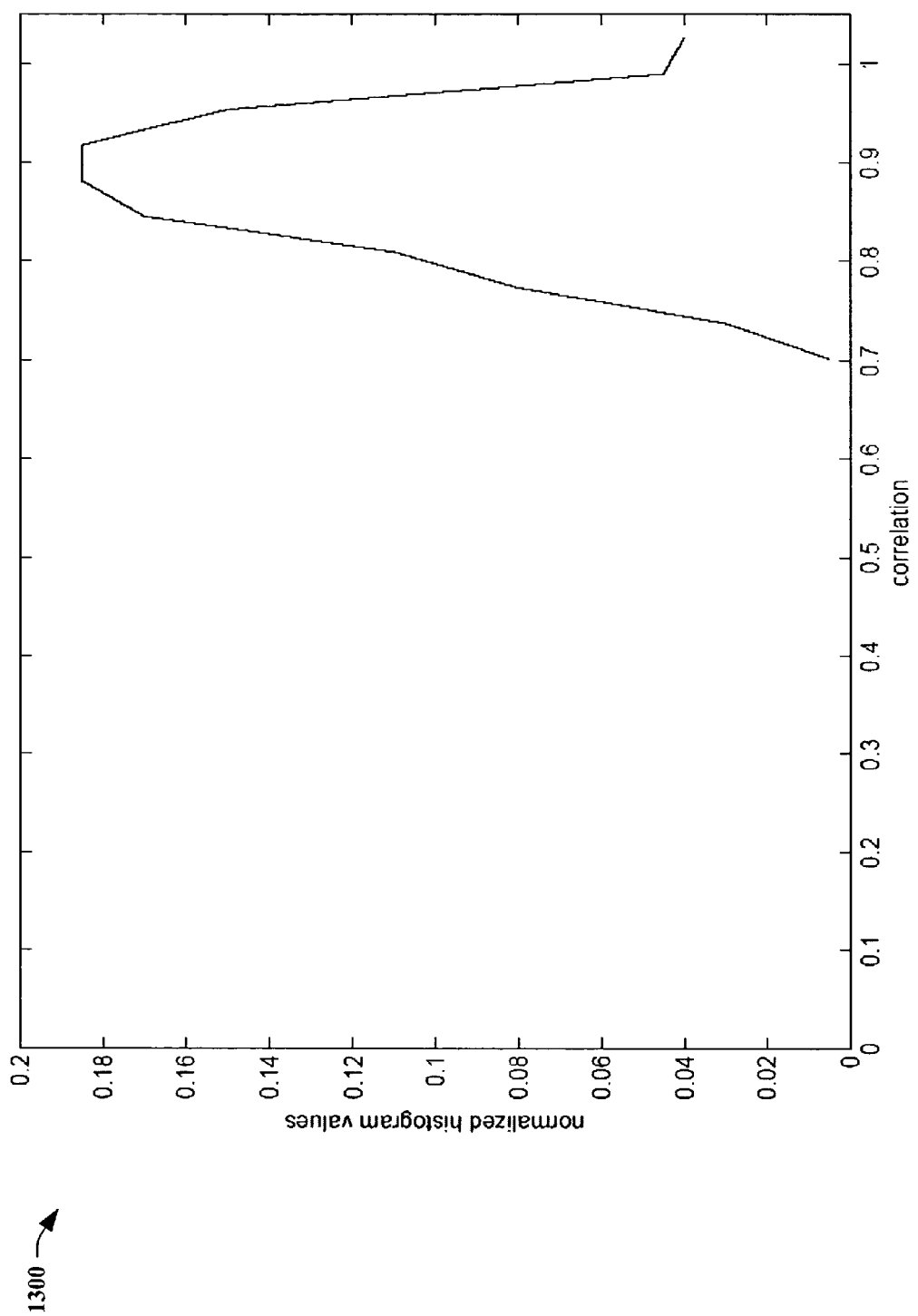
FIG. 13 is a graph of a histogram of a rotational attack in accordance with an aspect of the present invention.

In FIG. 13, a histogram 1300 of the detector output where every frame of a video was rotated by 1 degree clockwise is shown. The distribution has a mean of 0.88 and std of 0.07.

For compression attacks, a video sequence was utilized from a movie. The sequence was 480 by 480 resolution, same length as the prior 300 frames. The decomposition level along the spatial axis, which was 2 for the previous cases, is increased to 3. The following results show the correlation values for one specific key, but it was evidenced that the key space distribution does not vary significantly, so this value is a substantial representative of the general behavior. MPEG-2 and H.264 JM6.1 video encoders were used for compression.

MPEG-2 at 0.75 Mbit/s Corr=0.878
MPEG-2 at 0.5 Mbit/s Corr=0.731
H.264 at 0.5 Mbit/s Corr=0.783
H.264 at 0.2 Mbit/s Corr=0.631
H.264 at 0.137 Mbit/s Corr=0.573

For MPEG-2, 0.5 Mbit/s was the bit rate at which the visual artifacts were obviously disturbing. For 11.264, this rate was 0.2 Mbit/s. Using one more level of decomposition along the time axis improves these results further.

The following result shows the robustness against a combined attack. First, every frame is 1 degree rotated, 10 percent cropped, then resized back to the original size and histogram equalization is applied. Time interpolation, done every 30 frames, is interpolated into 28 frames, which corresponds to 7 percent time compression. After 1 frame shift, the resulting video signal is compressed with MPEG-2 video encoder at 0.5 Mbps.

Figure 14:
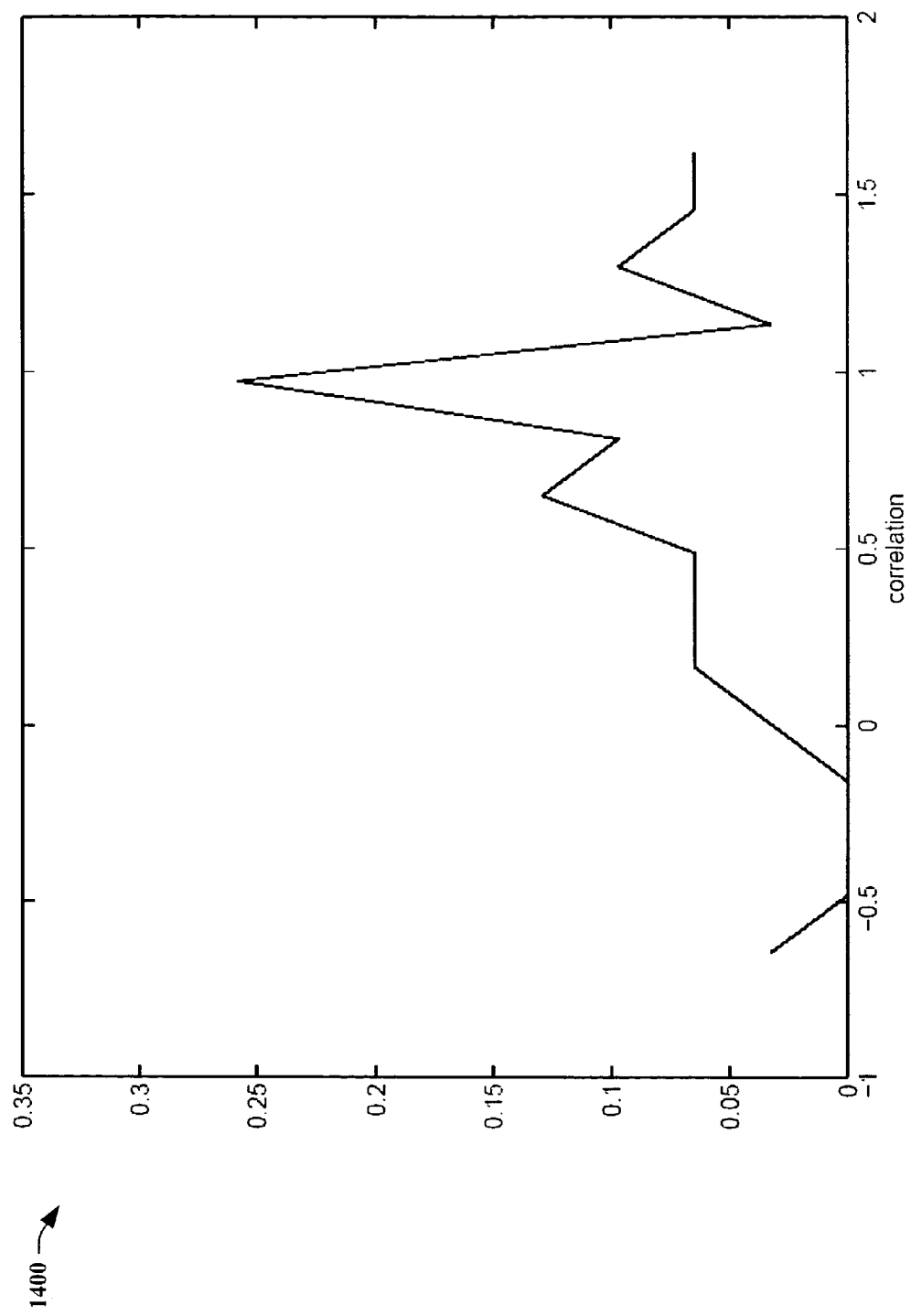
FIG. 14 is a graph of a histogram of a correlation after rotation in accordance with an aspect of the present invention.

The results showed that when the intentional de-synchronization method explained supra was not used, for both the averaging and replacement type of attacks, the mean of the correlation value is 1/K, where K is the number of colluders. In FIG. 14, a histogram 1400 of correlation detector output after rotation is shown.

Figure 15:
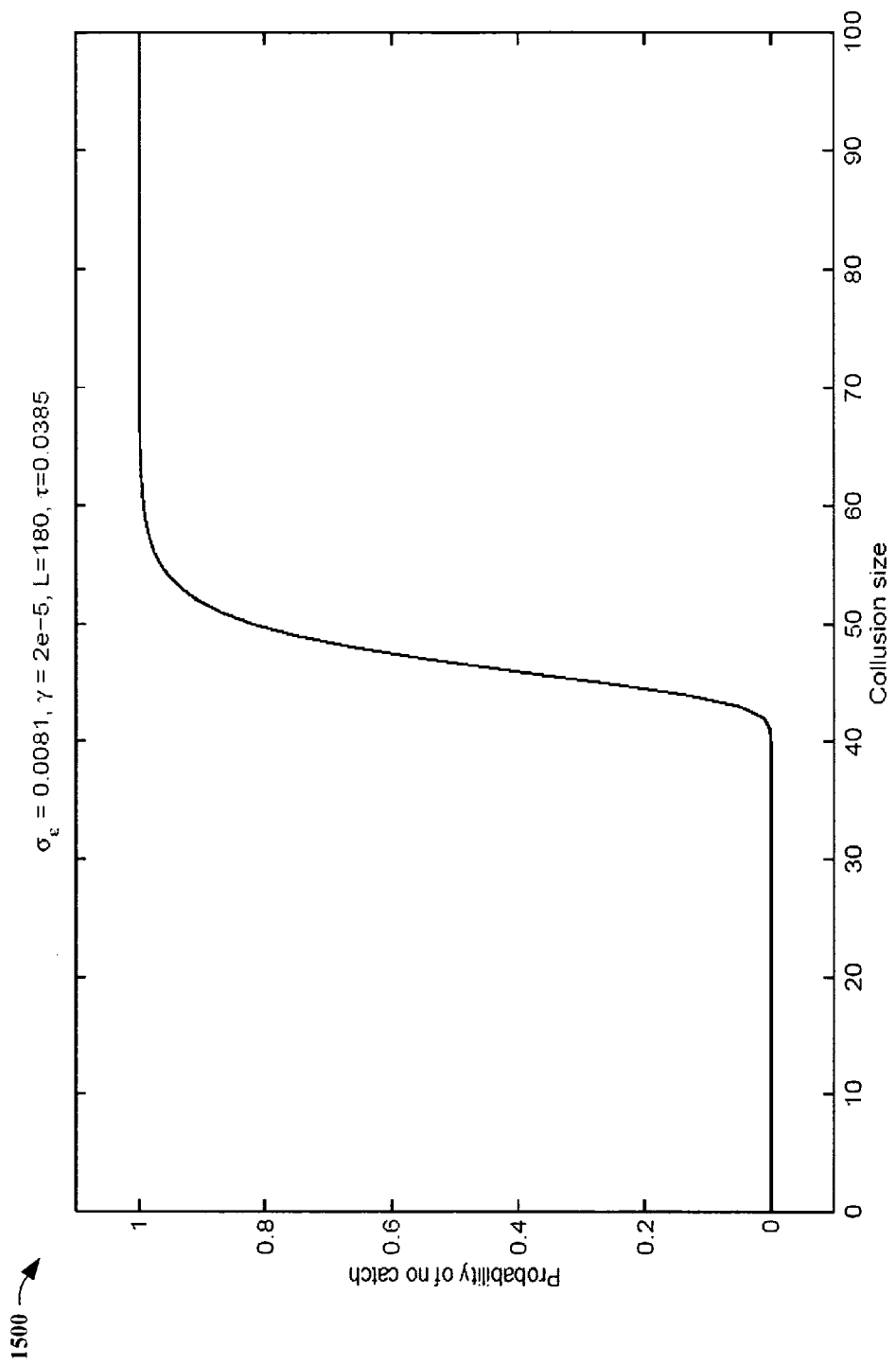
FIG. 15 is a graph of a probability of no-catch without de-synch applied in accordance with an aspect of the present invention.
Figure 16:
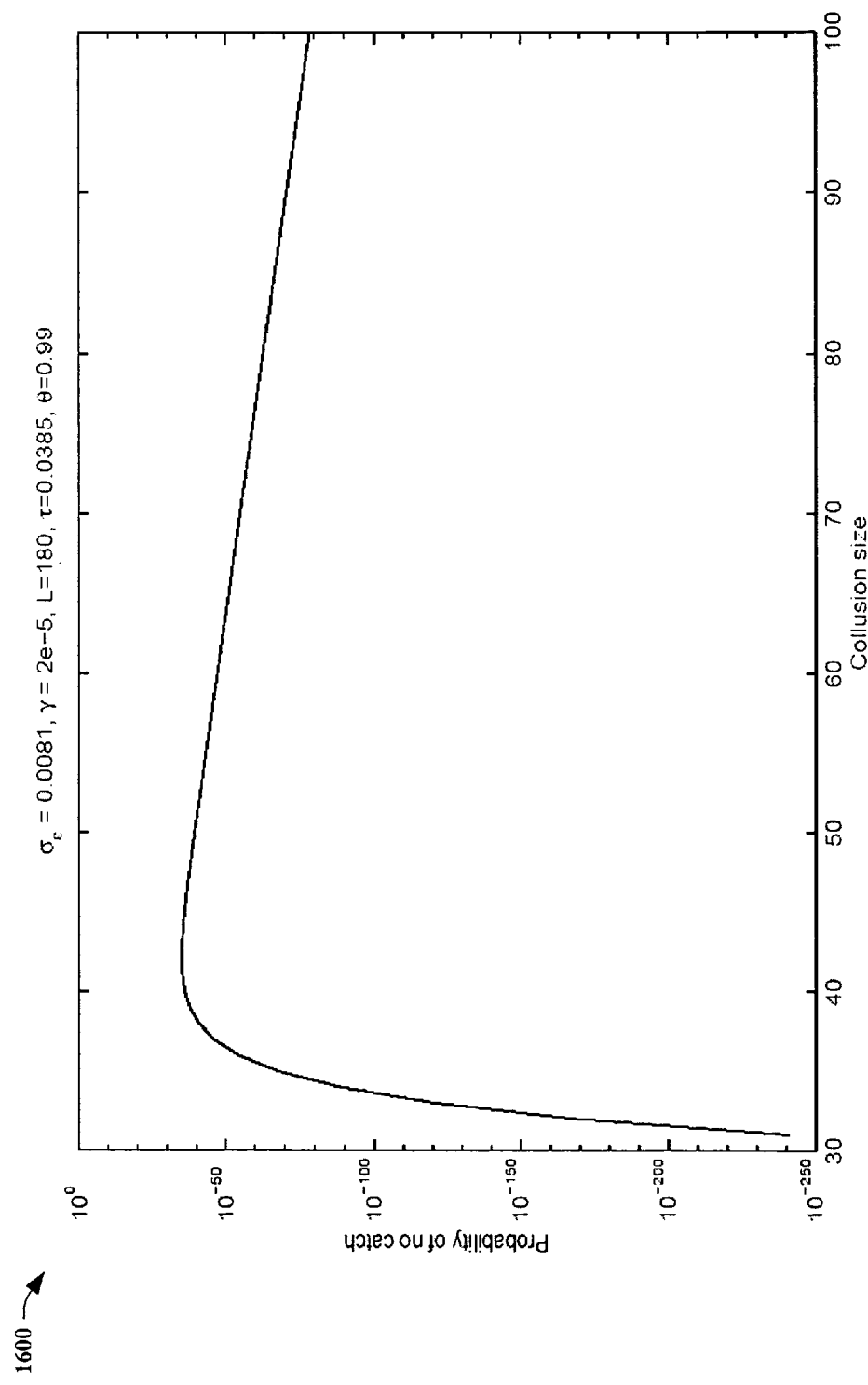
FIG. 16 is a graph of a probability of no-catch with de-synch applied in accordance with an aspect of the present invention.

The de-synchronization method explained supra is a very powerful tool against collusion type of attacks. As illustrated previously, experimental results indicate that choosing $\tau=0.0385$ is necessary to have a false-positive-probability of $10^{-6}$. For a 2-hour movie, assuming watermarking of $\frac{1}{10}$-th of the movie, L=180, where L is the number of mark embedding positions. Now consider the event of no-catch. The "no-catch" event occurs if the detector misses all the colluders in a collusion of size K. In a collusion of size K, colluder i is caught if $C_i(K) > \tau$ and colluder i is missed if $C_i(K) < \tau$. FIGS. 15-16 show probabilities of the no-catch event, without and with applying an intentional de-synchronization. In FIGS. 15-16, it is assumed that a pair of users can align a frame with a probability of 0.99.

In yet another instance of the present invention, multiple mark embedding points are chosen and time synchronization is achieved by image hash values such as that described in M. K. Mihcak and R. Venkatesan, "New Iterative Geometric Methods for Robust Perceptual Image Hashing," Proceedings of ACM Workshop on Security and Privacy in Digital Rights Management, Philadelphia, Pa., November 2001.

In still yet another instance of the present invention, performance of a detection metric is improved by correlation of pseudo-randomly chosen subsets of object groupings. After sorting the results, an average correlation of highest N subsets is declared as an overall correlation value. This method reduces an effect of specific object groupings being severely hurt by attacks.

In still yet another instance of the present invention, robustness of compression types of attacks along the time axis, like video encoders, is reinforced by utilizing shape adaptation of object groupings along a time axis dependent on a (possibly pseudo-random) motion search. Basically, chosen object grouping locations are updated along the time axis to adapt the motion in the media; in this way statistics are computed along a trajectory that probabilistically follows the motion (as opposed to the usage of rigid 3D bodies which are rectangular prisms). This provides better de-correlation of the media signal along the time axis and improves security properties of the system.

Figure 17:
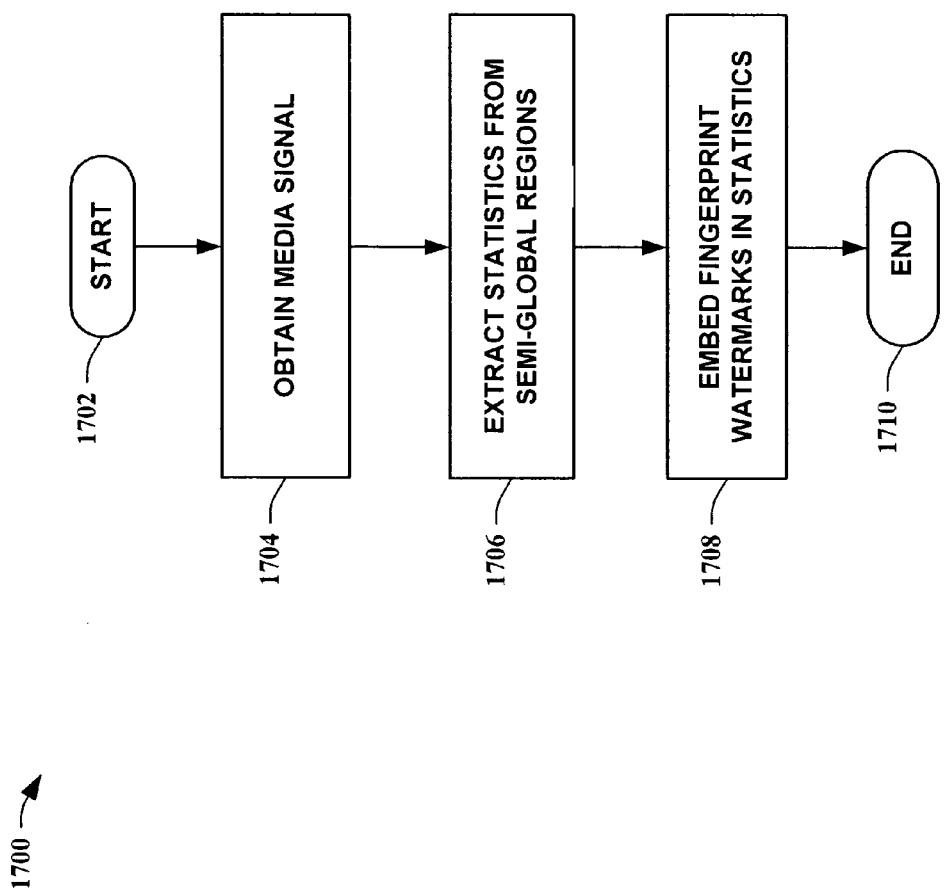
FIG. 17 is a flow diagram of a method of facilitating media forensics in accordance with an aspect of the present invention.
Figure 18:
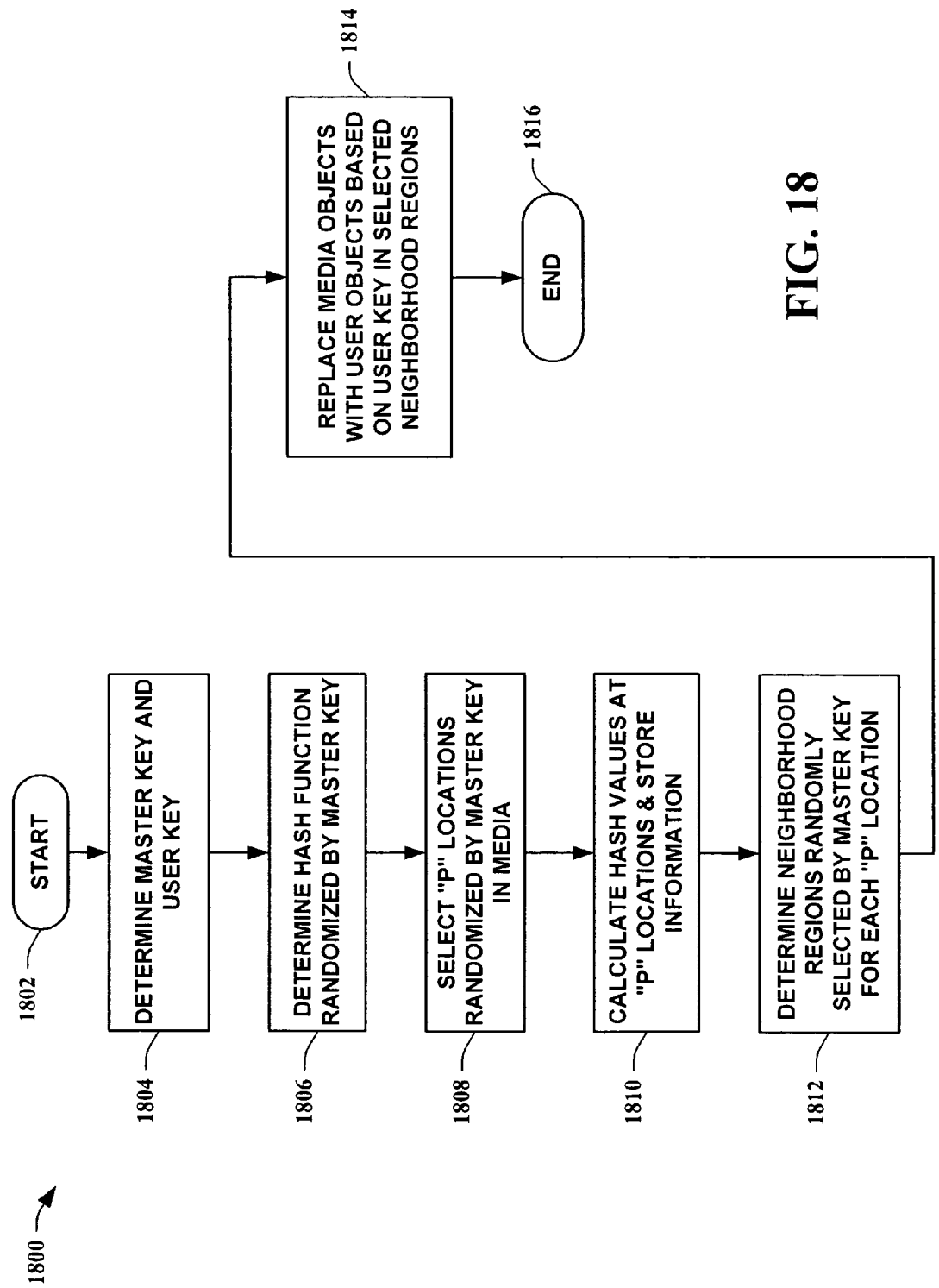
FIG. 18 is another flow diagram of a method of facilitating media forensics in accordance with an aspect of the present invention.
Figure 19:
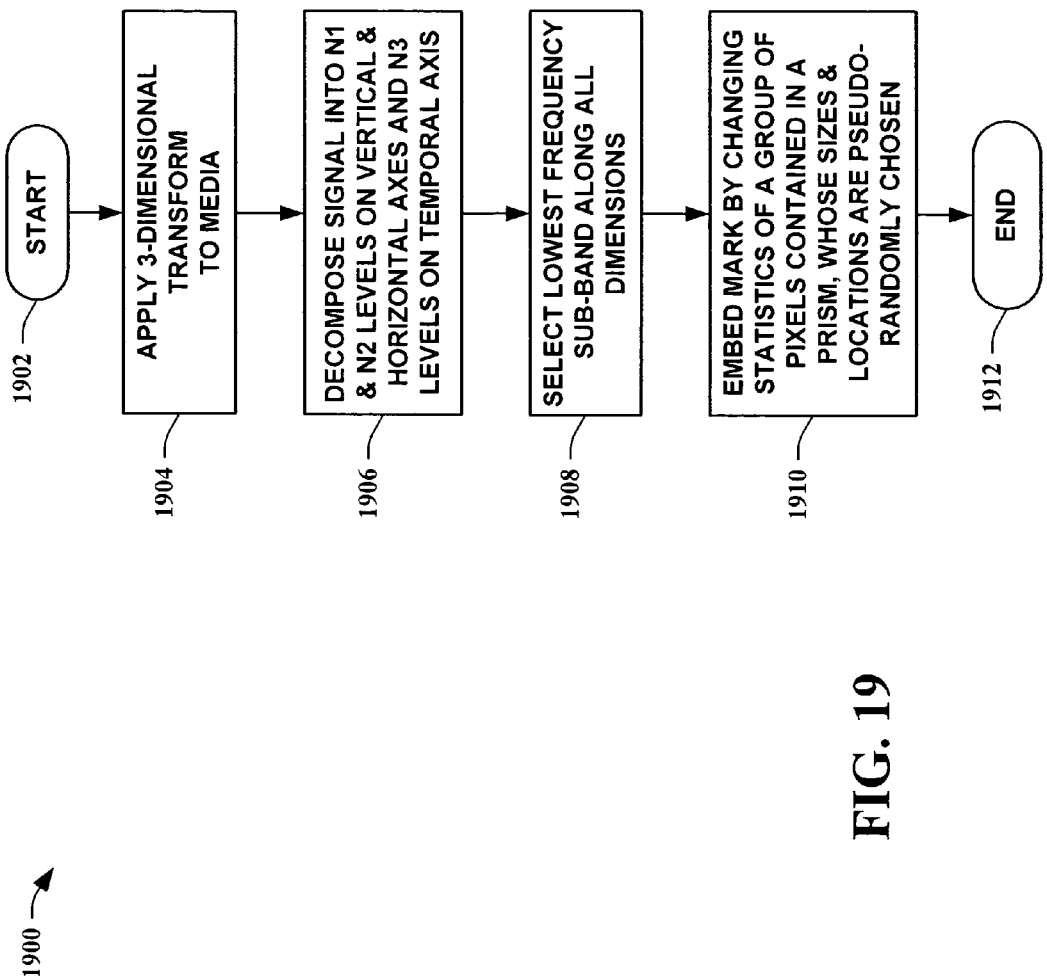
FIG. 19 is yet another flow diagram of a method of facilitating media forensics in accordance with an aspect of the present invention.

In view of the exemplary systems shown and described above, methodologies that may be implemented in accordance with the present invention will be better appreciated with reference to the flow charts of FIGS. 17-19. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments.

In FIG. 17, a flow diagram of a method 1700 of facilitating media forensics in accordance with an aspect of the present invention is shown. The method 1700 starts 1702 by obtaining a media signal 1704. The media signal can be obtained from any type of media including, but not limited to, audio, images, and video and the like. The media signal is generally obtained by an N-dimensional transform technique, where N is any integer from one to infinity, based on linear transform signal processing utilizing, for example, linear shift invariant filters. However, any operator that compactly captures the energy of the media signal can be employed by the present invention. Other acceptable examples of instances of the present invention can utilize separable filters, non-separable filters, linear shift invariant filters, linear shift filters, and N-dimensional wavelet transforms and the like. For the N-dimensional transform technique, additional dimensions can be utilized by projecting the media signal into higher dimensions. Statistics are then extracted from semi-global regions of the media signal 1706. Typically, a lower level sub-band is utilized to obtain random objects from which to extract the statistics. Keying is utilized to determine at what point in the media signal that the statistics are extracted. Pseudo-randomization is also utilized during the statistical extraction to further abstract and secure the process. Fingerprint watermarks are then embedded into the statistics 1708, ending the flow 1710. This is generally accomplished by obtaining a watermark signal that minimizes perception in the media signal while maintaining substantially similar quantized statistics of the media signal.

Referring to FIG. 18, another flow diagram of a method 1800 of facilitating media forensics in accordance with an aspect of the present invention is depicted. The method 1800 starts 1802 by determining a master key and a user key 1804. A hash function is then determined that is pseudo-randomized by the master key 1806. Locations for embedding watermarks in media are then selected pseudo-randomly utilizing the master key 1808. Hash values are then calculated for the selected locations, and this information is then stored for possible utilization in subsequent detection schema 1810. Neighborhood regions are pseudo-randomly selected utilizing the master key for each selected location 1812. Media objects obtained from the neighborhood regions of a selected location are replaced with user objects based on the user key 1814, ending the flow 1816.

Looking at FIG. 19, yet another flow diagram of a method 1900 of facilitating media forensics in accordance with an aspect of the present invention is illustrated. The method 1900 starts 1902 by applying a three-dimensional transform to digital media to obtain a three-dimensional media signal 1904. The three-dimensional media signal is then decomposed into N1 and N2 levels on vertical and horizontal axes and N3 levels on a temporal axis 1906. An example illustration of this can be seen in FIG. 7. Lowest frequency sub-bands are then selected along all dimensions of the decomposed signal 1908. A watermark is embedded into the media by altering statistics of a group of entities, such as, for example, pixels, whose sizes and locations are pseudo-randomly chosen in objects, such as, for example, a prism within a sub-band 1910, ending the flow 1912.

Figure 20:
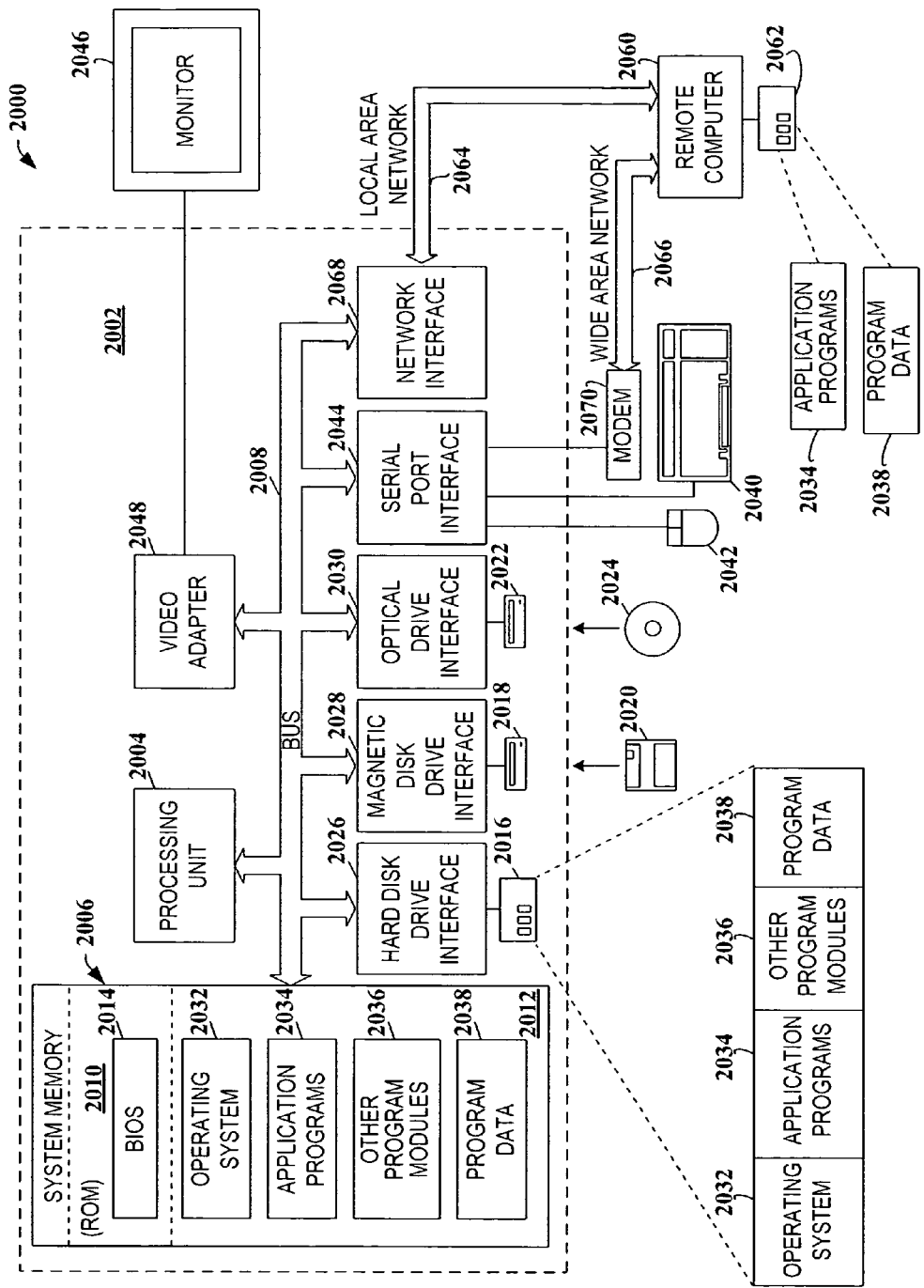
FIG. 20 illustrates an example operating environment in which the present invention can function.

In order to provide additional context for implementing various aspects of the present invention, FIG. 20 and the following discussion is intended to provide a brief, general description of a suitable computing environment 2000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 20, an exemplary system environment 2000 for implementing the various aspects of the invention includes a conventional computer 2002, including a processing unit 2004, a system memory 2006, and a system bus 2008 that couples various system components, including the system memory, to the processing unit 2004. The processing unit 2004 may be any commercially available or proprietary processor. In addition, the processing unit may be implemented as multi-processor formed of more than one processor, such as may be connected in parallel.

The system bus 2008 may be any of several types of bus structure including a memory bus or memory controller, a peripheral bus, and a local bus using any of a variety of conventional bus architectures such as PCI, VESA, Microchannel, ISA, and EISA, to name a few. The system memory 2006 includes read only memory (ROM) 2010 and random access memory (RAM) 2012. A basic input/output system (BIOS) 2014, containing the basic routines that help to transfer information between elements within the computer 2002, such as during start-up, is stored in ROM 2010.

The computer 2002 also may include, for example, a hard disk drive 2016, a magnetic disk drive 2018, e.g., to read from or write to a removable disk 2020, and an optical disk drive 2022, e.g., for reading from or writing to a CD-ROM disk 2024 or other optical media. The hard disk drive 2016, magnetic disk drive 2018, and optical disk drive 2022 are connected to the system bus 2008 by a hard disk drive interface 2026, a magnetic disk drive interface 2028, and an optical drive interface 2030, respectively. The drives 2016-2022 and their associated computer-readable media provide nonvolatile storage of data, data structures, computer-executable instructions, etc. for the computer 2002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 2000, and further that any such media may contain computer-executable instructions for performing the methods of the present invention.

A number of program modules may be stored in the drives 2016-2022 and RAM 2012, including an operating system 2032, one or more application programs 2034, other program modules 2036, and program data 2038. The operating system 2032 may be any suitable operating system or combination of operating systems. By way of example, the application programs 2034 and program modules 2036 can include a media forensic facilitation scheme in accordance with an aspect of the present invention.

A user can enter commands and information into the computer 2002 through one or more user input devices, such as a keyboard 2040 and a pointing device (e.g., a mouse 2042). Other input devices (not shown) may include a microphone, a joystick, a game pad, a satellite dish, wireless remote, a scanner, or the like. These and other input devices are often connected to the processing unit 2004 through a serial port interface 2044 that is coupled to the system bus 2008, but may be connected by other interfaces, such as a parallel port, a game port or a universal serial bus (USB). A monitor 2046 or other type of display device is also connected to the system bus 2008 via an interface, such as a video adapter 2048. In addition to the monitor 2046, the computer 2002 may include other peripheral output devices (not shown), such as speakers, printers, etc.

It is to be appreciated that the computer 2002 can operate in a networked environment using logical connections to one or more remote computers 2060. The remote computer 2060 may be a workstation, a server computer, a router, a peer device or other common network node, and typically includes many or all of the elements described relative to the computer 2002, although, for purposes of brevity, only a memory storage device 2062 is illustrated in FIG. 20. The logical connections depicted in FIG. 20 can include a local area network (LAN) 2064 and a wide area network (WAN) 2066. Such networking environments are commonplace in offices, enterprise-wide computer networks, intranets and the Internet.

When used in a LAN networking environment, for example, the computer 2002 is connected to the local network 2064 through a network interface or adapter 2068. When used in a WAN networking environment, the computer 2002 typically includes a modem (e.g., telephone, DSL, cable, etc.) 2070, or is connected to a communications server on the LAN, or has other means for establishing communications over the WAN 2066, such as the Internet. The modem 2070, which can be internal or external relative to the computer 2002, is connected to the system bus 2008 via the serial port interface 2044. In a networked environment, program modules (including application programs 2034) and/or program data 2038 can be stored in the remote memory storage device 2062. It will be appreciated that the network connections shown are exemplary and other means (e.g., wired or wireless) of establishing a communications link between the computers 2002 and 2060 can be used when carrying out an aspect of the present invention.

In accordance with the practices of persons skilled in the art of computer programming, the present invention has been described with reference to acts and symbolic representations of operations that are performed by a computer, such as the computer 2002 or remote computer 2060, unless otherwise indicated. Such acts and operations are sometimes referred to as being computer-executed. It will be appreciated that the acts and symbolically represented operations include the manipulation by the processing unit 2004 of electrical signals representing data bits which causes a resulting transformation or reduction of the electrical signal representation, and the maintenance of data bits at memory locations in the memory system (including the system memory 2006, hard drive 2016, floppy disks 2020, CD-ROM 2024, and remote memory 2062) to thereby reconfigure or otherwise alter the computer system's operation, as well as other processing of signals. The memory locations where such data bits are maintained are physical locations that have particular electrical, magnetic, or optical properties corresponding to the data bits.

Figure 21:
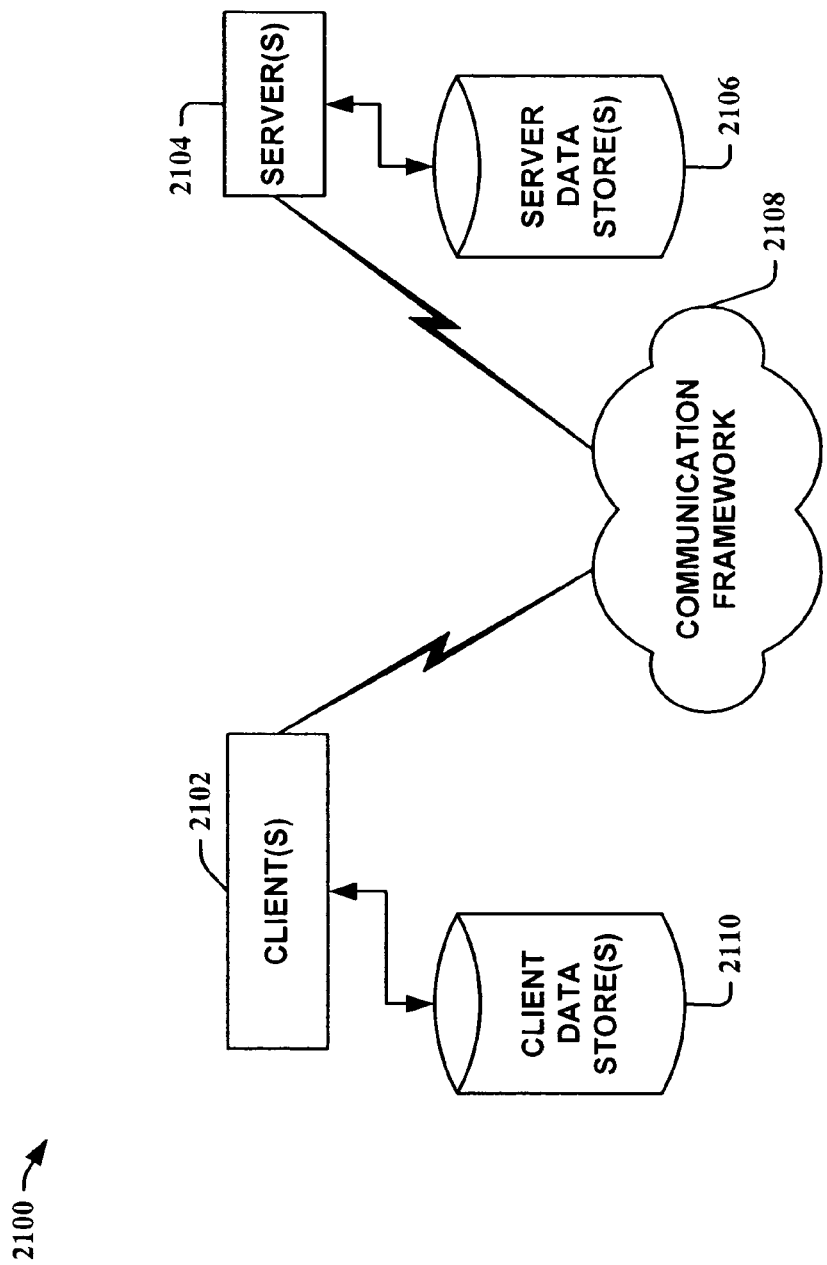
FIG. 21 illustrates another example operating environment in which the present invention can function.

FIG. 21 is another block diagram of a sample computing environment 2100 with which the present invention can interact. The system 2100 further illustrates a system that includes one or more client(s) 2102. The client(s) 2102 can be hardware and/or software (e.g., threads, processes, computing devices). The system 2100 also includes one or more server(s) 2104. The server(s) 2104 can also be hardware and/or software (e.g., threads, processes, computing devices). The server(s) 2104 can house threads to perform transformations by employing the present invention, for example. One possible communication between a client 2102 and a server 2104 may be in the form of a data packet adapted to be transmitted between two or more computer processes. The system 2100 includes a communication framework 2108 that can be employed to facilitate communications between the client(s) 2102 and the server(s) 2104. The client(s) 2102 are operably connected to one or more client data store(s) 2110 that can be employed to store information local to the client(s) 2102. Similarly, the server(s) 2104 are operably connected to one or more server data store(s) 2106 that can be employed to store information local to the server(s) 2104.

In one instance of the present invention, a data packet transmitted between two or more computer components that facilitates media forensics, the data packet is comprised of, at least in part, information relating to at least one media source, the information including, at least in part, at least one unique identifier embedded into an N-dimensional media signal via transformation of digital media into an N-dimensional signal.

It is to be appreciated that the systems and/or methods of the present invention can be utilized in media forensics for employing computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
   a processor;
   a memory storing components for execution by the processor to facilitate watermarking of digital media, comprising the following computer executable components:
   an N-dimensional transform component that transforms a digital media into an N-dimensional signal, where N represents any positive integer from one to infinity;
   a location selection component that:
   employs a unique user identification key, $K_i$, and a master key, K, to choose at least one location for a watermark; and
   outputs parametric data comprising hash center points and pole frames related to the at least one location; and
   a watermark component that:
   receives the parametric data related to the at least one location,
   selects a sub-band of the N-dimensional signal based at least upon the parametric data related to the at least one location;
   generates pseudo-random objects in the selected sub-band and pseudo-random weights for each object;
   derives pseudo-random statistics for each object from the weights for the object and elements of the object, the statistics derived via a pseudo-random semi-global statistics approach;
   quantizes the statistics;
   selects a minimum-norm disturbance in the N-dimensional signal corresponding to the quantized statistics as a watermark; and
   embeds the watermark by adding the minimum-norm disturbance to the N-dimensional signal.

2. The system of claim 1, wherein the digital media is audio media, image media, or video media.

3. The system of claim 1, wherein N is three.

4. The system of claim 1, wherein the pseudo-randomly derived semi-global statistics approach utilizes, at least in part, non-linear statistics.

5. The system of claim 1, wherein the pseudo-randomly derived semi-global statistics approach is based, at least in part, upon the master key, K.

6. One or more computer-readable storage media storing computer-executable instructions, that, when executed, cause one or more processors to perform a method for embedding and detecting forensic marks in a digital media comprising:

transforming a digital media signal into an N-dimensional signal, where N represents any positive integer from one to infinity;

determining at least one location in the N-dimensional signal pseudo-randomly based at least in part upon a unique user identification key, $K_j$, and a master key, and deriving parametric data comprising hash center points and pole frames related to the at least one location;

selecting objects at the least one location on the lowest frequency sub-band of the N-dimensional signal according to the parametric data related to the at least one location;

deriving statistics from the entities within the objects, the statistics further comprises utilizing a pseudo-randomly derived semi-global statistics approach;

quantizing the statistics;

selecting a watermark, wherein the watermark is a minimum-norm disturbance corresponding to the quantized statistics;

embedding the watermark into the N-dimensional signal by adding the minimum-norm disturbance to the original signal; and detecting the watermark based at least in part upon the parametric data, wherein the parametric data is utilized to synchronize the digital media signal with an original digital media signal.

7. The one or more computer-readable storage media of claim 6, wherein transforming the digital media into the N-dimensional signal comprises:

utilizing a transformation operator that compactly captures energy of the digital media into the N-dimensional signal.

8. The one or more computer-readable storage media of claim 7, wherein the transformation operator is a separable filter, a non-separable filter, a linear shift invariant filter, a linear shift filter, or a P-dimensional wavelet transform, where P is any positive integer from one to infinity.

9. The one or more computer-readable storage media of claim 6, further comprising:

detecting the watermark based at least in part upon the parametric data.

10. The one or more computer-readable storage media of claim 6, wherein the pseudo-randomly derived semi-global statistics approach utilizes non-linear statistics.

11. The one or more computer-readable storage media of claim 6, wherein determining at least one location in the N-dimensional signal further comprises:

utilizing shape adaptation of object groupings along a time axis dependent on a motion search.

12. One or more computer-readable storage media storing computer-executable instructions that, when executed, cause one or more processors to perform a method for watermark detection comprising:

detecting a watermark from an altered or unaltered user fingerprinted digital media, wherein the watermark indicates a particular user associated with the altered or unaltered user fingerprinted digital media;

identifying the particular user associated with the altered or unaltered user fingerprinted digital media based at least in part upon parametric data related to the watermark location, wherein the parametric data is associated with a master key and a specific user key and includes hash center points and pole frames of the location of the watermark, and wherein the parametric data is utilized to synchronize the altered or unaltered user fingerprinted digital media with an original digital media;

correlating pseudo-randomly chosen subsets of object groupings relating to statistical information contained in the embedded watermark derived via a pseudo-random semi-global statistics approach; and sorting resulting correlations and utilizing an average correlation of highest X subsets as an overall correlation value to minimize an effect of at least one specific object grouping hurt by an attack, where X is any positive integer from one to infinity.

13. One or more computer readable media having stored thereon computer executable components of the system of claim 1.

14. A device comprising the one or more computer-readable storage media of claim 6, and further comprising at least one selected from the group consisting of a computer, a server, and a handheld electronic device.

15. A device embodying the system of claim 1 comprising at least one selected from the group consisting of a computer, a server, and a handheld electronic device.

* * * * *

UNITED STATES PATENT AND TRADEMARK OFFICE
CERTIFICATE OF CORRECTION

Page 1 of 1

PATENT NO.        : 8,032,754 B2
APPLICATION NO.   : 10/754235
DATED             : October 4, 2011
INVENTOR(S)       : Mehmet Kivanc Mihcak et al.

It is certified that error appears in the above-identified patent and that said Letters Patent is hereby corrected as shown below:

In column 27, line 6, in Claim 6, after "key," insert -- K --.

Signed and Sealed this
Twenty-second Day of November, 2011

David J. Kappos
*Director of the United States Patent and Trademark Office*